United States Patent
Takatani et al.

[11] Patent Number: 6,122,026
[45] Date of Patent: Sep. 19, 2000

[54] LCD COMPRISING AN ANGLE BETWEEN DIFFUSING-DIRECTION AND SLOW-AXIS OF RETARDER

[75] Inventors: Tomoo Takatani; Takeyuki Ashida, both of Nara, Japan

[73] Assignee: Sharp Kabushiki Kaisha, Osaka, Japan

[21] Appl. No.: 08/877,521

[22] Filed: Jun. 17, 1997

[30] Foreign Application Priority Data

Jun. 18, 1996 [JP] Japan ..................................... 8-157255

[51] Int. Cl.⁷ ............................. G02F 1/1335; G02F 1/13
[52] U.S. Cl. ........................... 349/112; 349/118; 349/179
[58] Field of Search .................................. 349/112, 117, 349/118, 179

[56] References Cited

U.S. PATENT DOCUMENTS

| | | | |
|---|---|---|---|
| 4,239,349 | 12/1980 | Scheffer et al. | 349/117 |
| 5,249,071 | 9/1993 | Yoshimizu et al. | 349/117 |
| 5,629,784 | 5/1997 | Abileah et al. | 349/112 |
| 5,680,184 | 10/1997 | Nishino | 349/118 |
| 5,699,137 | 12/1997 | Kishimoto | 349/119 |
| 5,731,858 | 3/1998 | Hisatake et al. | 349/112 |
| 5,796,455 | 8/1998 | Mizobata et al. | 349/113 |
| 5,825,442 | 10/1998 | Yoneda et al. | 349/112 |

FOREIGN PATENT DOCUMENTS

| | | |
|---|---|---|
| 5-157911 | 5/1993 | Japan . |
| 6-194648 | 7/1994 | Japan . |
| 7-509327 | 10/1995 | Japan . |
| 8-122755 | 5/1996 | Japan . |
| 95/01584 | 1/1995 | WIPO . |

*Primary Examiner*—William L. Sikes
*Assistant Examiner*—Toan Ton
*Attorney, Agent, or Firm*—David G. Conlin; Peter J. Manus; Dike Bronstein Roberts & Cushman

[57] ABSTRACT

A sufficiently wide viewing angle characteristic is obtained while a sufficient front contrast is ensured. With respect to the light transmitted by a polarizing plate and a phase difference plate before exiting from a liquid crystal display device, the viewing angle in the 12–6 o'clock direction is improved by a phase difference plate. By a light diffusing plate, a sufficient front contrast is ensured by causing the light to exit in the direction of the normal and the light is diffused in the 9–3 o'clock direction where the viewing angle is not improved by the phase difference plate. In the case where the light diffusing plate has a double refractivity, the liquid crystal display apparatus is arranged so that the light is transmitted by the light diffusing plate after transmitted by a polarizing plate. In the case where the light diffusing plate has no double refractivity, the liquid crystal display apparatus is arranged so that the light is transmitted by the polarizing plate after transmitted by the light diffusing plate.

9 Claims, 27 Drawing Sheets

Nz=0.1

Nz=0.2

Nz=0.3

Nz=0.4

Nz=0.5

FIRST COMPARATIVE EXAMPLE

CROSS ANGLE: 50°

CROSS ANGLE: 60°

CROSS ANGLE: 70°

CROSS ANGLE: 80°

CROSS ANGLE: 90°

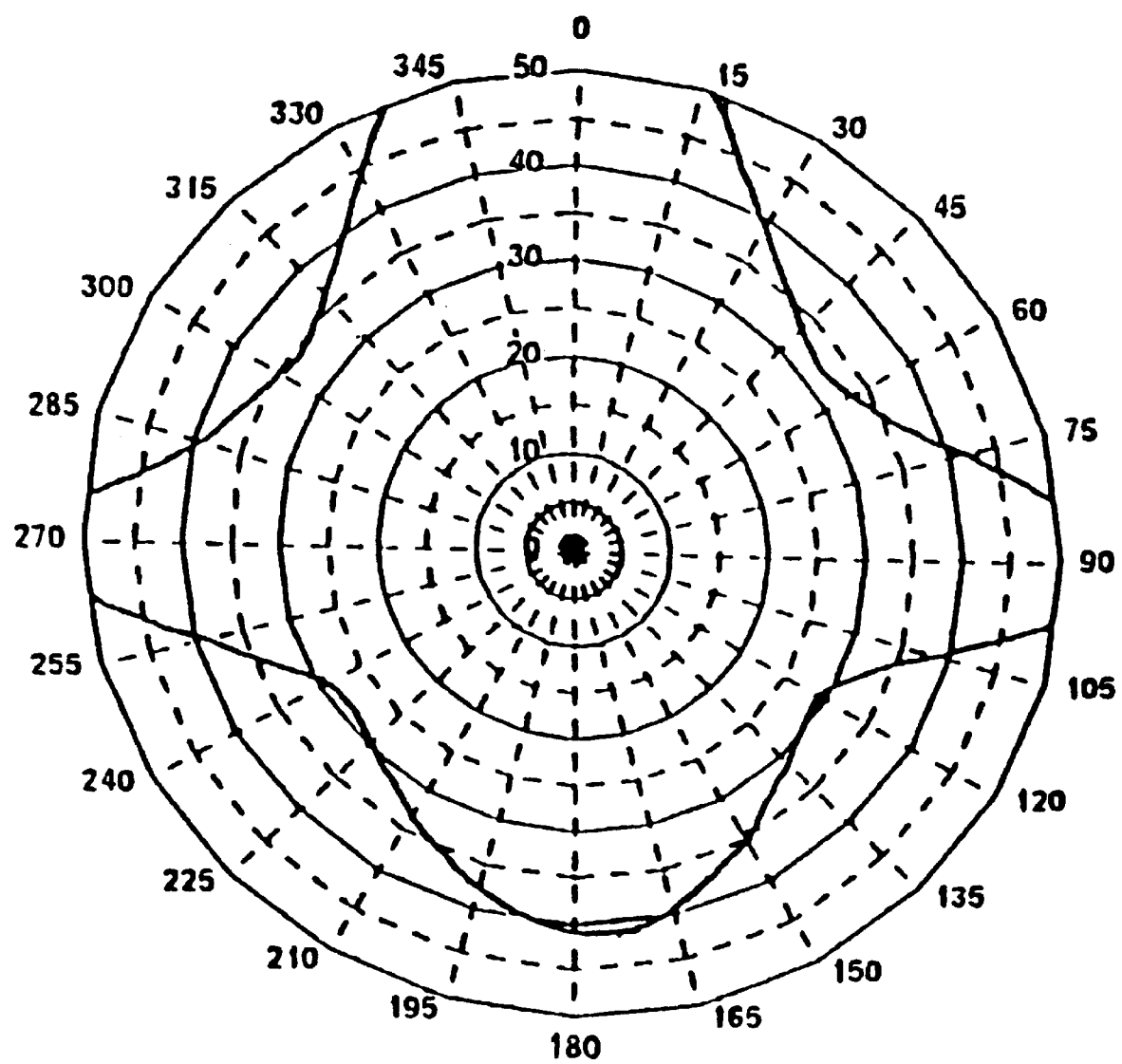

Nz=0.2

Nz=0.3

Nz=0.4

Nz=0.5

THIRD COMPARATIVE EXAMPLE

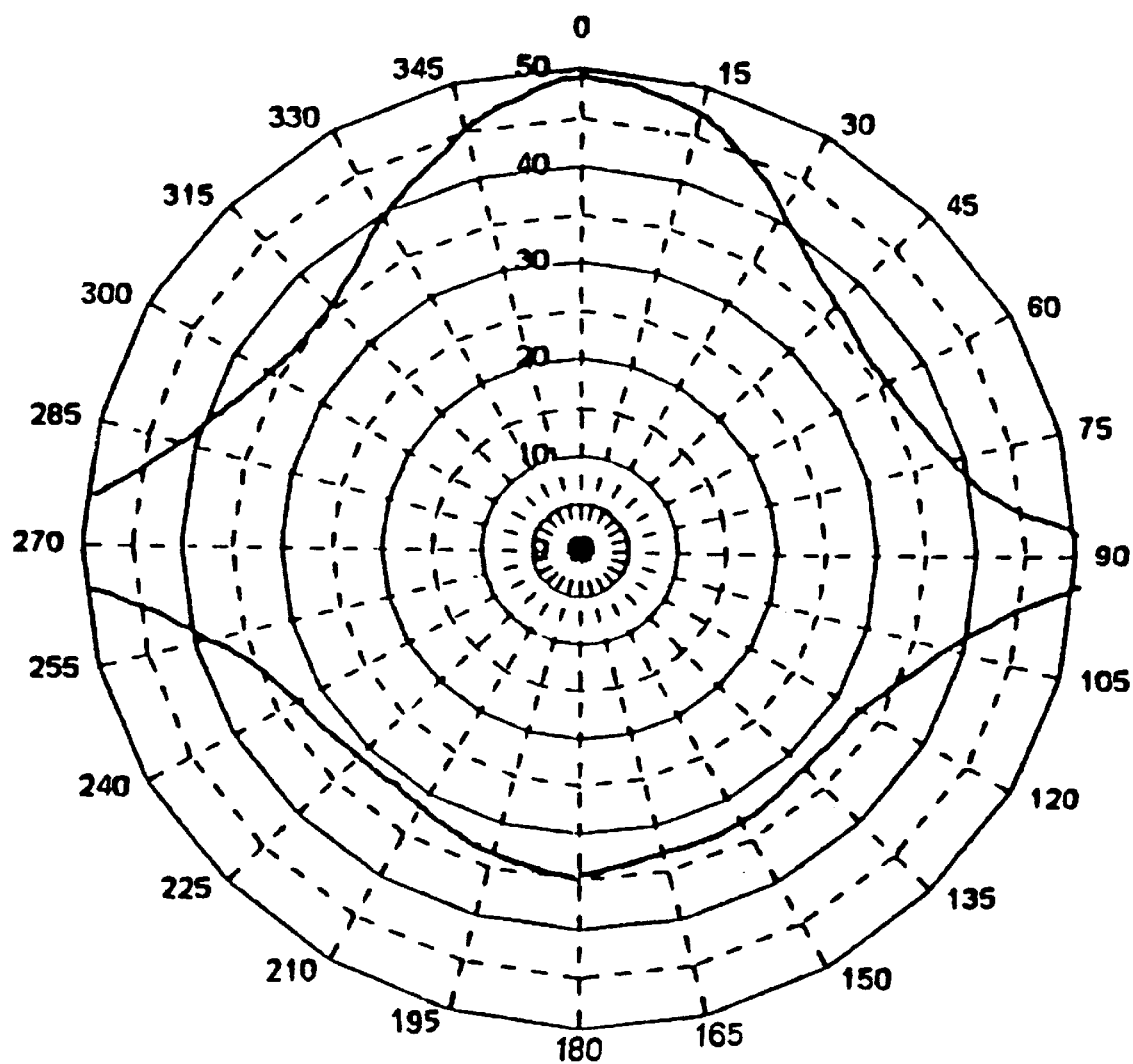

CROSS ANGLE: 10°

CROSS ANGLE: 20°

CROSS ANGLE: 30°

CROSS ANGLE: 40°

LCD COMPRISING AN ANGLE BETWEEN DIFFUSING-DIRECTION AND SLOW-AXIS OF RETARDER

BACKGROUND OF THE INVENTION

1. Field of the Invention

The present invention relates to a large-size super twisted nematic (STN) liquid crystal display apparatus used for displays adopted into office automation (OA) apparatuses such as word processors and personal computers, and for liquid crystal monitors proposed as substitutes for cathode-ray tubes (CRTs).

2. Description of the Related Art

A conventional STN liquid crystal display apparatus includes a pair of polarizing plates, a liquid crystal display device sandwiched between the pair of polarizing plates, at least one phase difference plate disposed between the polarizing plate and the liquid crystal display device, and a light diffusing plate disposed, for example, on the outer side of the polarizing plate, i.e. on the viewer's side. The liquid crystal display device includes a pair of glass substrates, a liquid crystal layer sandwiched between the glass substrates, a transparent electrode formed on the liquid crystal layer side surface of each glass substrate, and an orientation film formed on the liquid crystal layer side surface of each transparent electrode. On the side of the liquid crystal display apparatus opposite to the viewer's side is disposed a backlighting system in which a prism sheet, a sheet diffusing plate, a light director and a light source is disposed in this order from the side of the liquid crystal display apparatus.

A challenge for STN liquid crystal display apparatuses is to widen the viewing angle. The backlighting system disposed under the liquid crystal display apparatus typically includes one or two prism sheets in order to improve the front luminance, i.e. the luminance in the direction vertical to the display screen. The addition of one prism sheet increases the front luminance by approximately 70%. However, since the diffusion of the light in the direction orthogonal to the length of the grooves formed in the prism sheet depends on the vertical angle of the grooves, the viewing angle decreases according to the structure of the grooves. To solve the problem that the viewing angle decreases, a prior art widens the viewing angle by using a light diffusing plate and a three-dimensional phase difference plate whose refractive indices in the three-dimensional directions are controlled.

The arts disclosed in Japanese Unexamined Patent Publication JP-A 6-194648(1994) and Japanese Unexamined Patent Publication of Translation JP-A 7-509327(1995) use the light diffusing plate. In Japanese Unexamined Patent Publication JP-A 6-194648 (1994), a prism sheet whose upper surface is a prism surface and whose bottom surface is a smooth surface is disposed on the back surface side of the liquid crystal display device, and the light diffusing plate is disposed on the side of the liquid crystal display device opposite to the backlighting system. The light aligned by the prism sheet to be directed in a predetermined direction is diffused in all directions by the light diffusing plate, so that image information is obtained where the contrast and tone are similar to some extent over a wide range of viewing angle.

In Japanese Unexamined Patent Publication of Translation JP-A 7-509327 (1995), means for reflecting or means for diffusing is provided on the back surface side of the liquid crystal display device and a waveguide having a taper is disposed on the obverse surface of the liquid crystal display device.

The art disclosed in Japanese Unexamined Patent Publication JP-A 5-157911 (1993) uses the three-dimensional phase difference plate. In the art, a polarizing plate is disposed at least on one side of the liquid crystal display apparatus through at least one three-dimensional phase difference plate comprising a birefringent film with refractive indices set so that nx>nz>ny.

The prior art disclosed in Japanese Unexamined Patent Publication JP-A 8-122755 (1996) relates to a liquid crystal display apparatus of low viewing angle dependency, in which a liquid crystal cell is interposed between a pair of polarizing plates, light introducing means for introducing light into the liquid crystal cell is disposed on the external side of one of the pair of polarizing plates, and light diffusing means for diffusing light outgoing from the liquid crystal cell is disposed on the external side of the other of the pair of polarizing plate. The light diffusing means includes a first light diffusing means made of a polymer film, for selectively diffusing light of a predetermined direction which outgoes from the liquid crystal cell, and a second light diffusing means made of a polymer film, for selectively diffusing light of a predetermined direction out of the light diffused by the first light diffusing means. For example, the first light diffusing means diffuses light of a vertical direction selectively, and the second light diffusing means diffuses light of a lateral direction selectively. A vision control film (under a trade name of "Lumisty") manufactured by Sumitomo Chemical Co., Ltd. is used as a polymer film for such means.

The liquid crystal display apparatuses of the prior art are improved in viewing angle by using the light diffusing plate or the three dimensional phase difference plate to obtain image information whose contrast and color tone are substantially uniform over a wide range. In the arts using the conventional light diffusing plate and three-dimensional phase difference plate, however, since the light which enters the front faces of the plates perpendicularly is also diffused in all directions, the contrast in the direction perpendicular to the front face of the liquid crystal display apparatus deteriorates. In the case where the backlighting system includes a prism sheet to ensure a sufficient front luminance, the viewing angle is considerably narrowed.

SUMMARY OF THE INVENTION

An object of the invention is to provide a liquid crystal display apparatus having a wide viewing angle characteristic while ensuring a sufficient contrast in the direction perpendicular to the front face.

The invention provides a liquid crystal display apparatus comprising:

a pair of polarizing plates;

a super twisted nematic liquid crystal display device interposed between the polarizing plates;

a light diffusing plate for diffusing light having exited from the liquid crystal display device, in a predetermined direction; and a phase difference plate for improving a viewing angle in a direction in which the light is not diffused by the light diffusing plate, the phase difference plate being interposed at least between the polarizing plate on a light exit side and the liquid crystal display device.

According to the invention, light incident from the side of one of the pair of polarizing plates passes the liquid crystal display device and reaches the phase difference plate on the light exit side. The phase difference plate improves the viewing angle in a direction in which the light is not diffused by the light diffusing plate, for example, a direction orthogonal to the predetermined direction. The light which has passed the phase difference plate reaches the light diffusing plate. The light diffusing plate ensures a sufficient front contrast of the incident light and diffuses the light in the predetermined direction. For example, the light diffusing plate diffuses the light in the lateral direction and the phase difference plate improves the viewing angle in the vertical direction. By providing the liquid crystal display apparatus with such light diffusing plate and phase difference plate, a sufficiently wide viewing angle characteristic is obtained, while ensuring a sufficient front contrast. Accordingly the viewing angle characteristics required of large-size liquid crystal display apparatuses are obtained.

The invention is characterized in that the light diffusing plate is disposed between the polarizing plate on the light exit side and the phase difference plate adjacent to the polarizing plate.

According to the invention, by disposing the light diffusing plate between the polarizing plate on the light exit side and the phase difference plate adjacent to the polarizing plate, a sufficient front contrast is ensured to obtain a wide viewing angle characteristic and the light diffusing plate is protected. This disposition is suitable for light diffusing plates having no phase difference, i.e. having no directivity.

The invention is characterized in that the light diffusing plate is disposed on the outer side of the light exit side polarizing plate.

According to the invention, the light diffusing plate is disposed on the outer side of the light exit side polarizing plate. This disposition is suitable for light diffusing plates having a phase difference, i.e. having a directivity, and prevents coloration caused by the phase difference between the light diffusing plate and the light exit side polarizing plate.

The invention is characterized in that the light diffusing plate is formed by laminating two films each provided with regions of different refractive indices, that the regions are formed in parallel with a direction inclined at a predetermined angle to a direction of normal of the films in the predetermined direction, and that the predetermined angles are set in opposite directions with respect to the direction of normal of the films.

According to the invention, the light diffusing plate is formed in the manner described above and the light is diffused in the directions of inclination of the films. Specifically, the light incident in the direction of normal of the films exits without being diffused to ensure a sufficient front contrast. The light incident in a direction inclined to the direction of normal of the films is, by arranging the direction of inclination to coincide with the predetermined direction, diffused in the predetermined direction to widen the viewing angle. The light diffusing plate, which has no phase difference, is preferably disposed between the light exit side polarizing plate and the liquid crystal display device in order to protect the light diffusing plate.

The invention is characterized in that the light diffusing plate is formed of a polymeric film being drawn and having a plurality of spaced recesses on a surface thereof and that the recesses are formed in a direction orthogonal to the predetermined direction.

According to the invention, the recesses are formed in a direction orthogonal to the predetermined direction. When not passing through the recesses, the light incident on the light diffusing plate in the direction of normal of the films exits without being diffused to ensure a sufficient front contrast. When passing through the recesses, the incident light is diffused in the predetermined direction to widen the viewing angle. The light diffusing plate, which has a phase difference, is preferably disposed on the outer side of the light exit side polarizing plate in order to prevent coloration caused by the phase difference between the light diffusing plate and the light exit side polarizing plate.

The invention is characterized in that refractive indices nx, ny and nz of the phase difference plate in three-dimensional directions hold a relationship of nx>nz>ny and that an angle between a direction in which the light is diffused by the light diffusing plate and a slow axis of the phase difference plate adjacent to the light diffusing plate is selected to be in a range between 60° and 80°.

According to the invention, by disposing the three-dimensional phase difference plate having the relationship in a range in an optimum positional relationship, a symmetrically widened viewing angle characteristic is obtained.

The invention is characterized in that a coefficient Nz which is expressed by Nz=(nx−nz)/(nx−ny) and represents a ratio of a change in retardation value to a change in elevation angle of the phase difference plate is selected to be in a range between 0.2 and 0.4 when a wavelength $\lambda$ is 633 nm.

According to the invention, by using a three-dimensional phase difference plate having the coefficient Nz, a viewing angle characteristic is obtained which is well-balancedly widened in all directions.

The invention is characterized in that the phase difference plate is formed of a uniaxially drawn film and that an angle between a direction in which the light is diffused by the light diffusing plate and a slow axis of the phase difference plate adjacent to the light diffusing plate is selected to be in a range between 20° and 30°.

According to the invention, by disposing the uniaxially drawn phase difference plate in an optimum positional relationship, a well-balancedly widened viewing angle characteristic is obtained.

BRIEF DESCRIPTION OF THE DRAWINGS

Other and further objects, features, and advantages of the invention will be more explicit from the following detailed description taken with reference to the drawings wherein:

FIGS. 12A through 12E graphically show isocontrast curves where the contrast Co is 4 when the coefficient Nz of the three-dimensional phase difference plates 3 and 4 of the second embodiment is varied;

FIGS. 13A and 13B graphically show isocontrast curves where the contrast Co is 4 in a third comparative example and in a third embodiment.

DETAILED DESCRIPTION OF THE PREFERRED EMBODIMENTS

Figure 1:
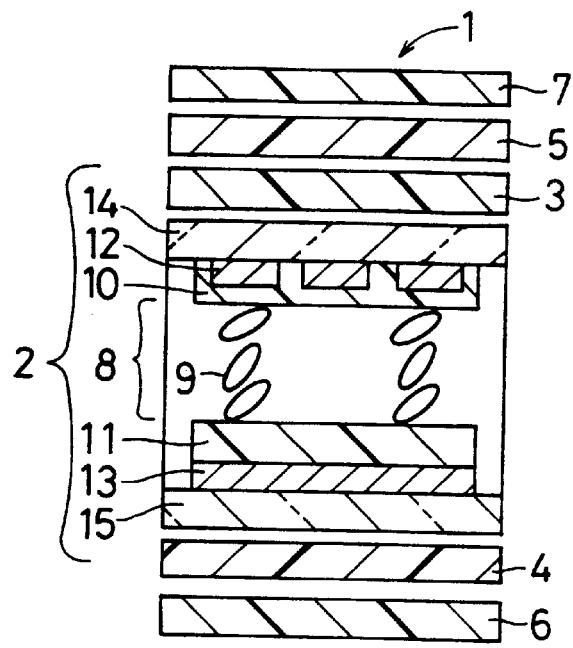
FIG. 1 is a sectional view showing the structure of a liquid crystal display apparatus 1 according to a first embodiment of the invention.

Now referring to the drawings, preferred embodiments of the invention are described below.

FIG. 1 is a sectional view showing the structure of a liquid crystal display apparatus 1 according to a first embodiment of the invention. The liquid crystal display apparatus 1 includes a liquid crystal display device 2, three-dimensional phase difference plates 3 and 4, polarizing plates 5 and 6, and a light diffusing plate 7. Between the polarizing plates 5 and 6 is disposed the liquid crystal display device 2 of the STN type. The three-dimensional phase difference plates 3 and 4 are disposed, for example, between the polarizing plates 5, 6 and the liquid crystal display device 2, respectively. The light diffusing plate 7 is disposed on the outer side of the polarizing plate 5, i.e. on the viewer's side.

The liquid crystal display device 2 includes a liquid crystal layer 8 including liquid crystal molecules 9, orientation films 10 and 11, transparent electrodes 12 and 13, and glass substrates 14 and 15 having a translucency. The liquid crystal layer 8 is disposed between the glass substrates 14 and 15. On the liquid crystal layer side surfaces of the glass substrates 14 and 15, the transparent electrodes 12 and 13 are formed, respectively. On the surfaces of the glass substrates 14 and 15 where the transparent electrodes 12 and 13 are formed, the orientation films 10 and 11 are formed substantially all over the surfaces.

The transparent electrodes 12 and 13 formed, for example, from indium tin oxide (ITO) have an excellent conductivity. The surfaces of the orientation films 10 and 11 formed, for example, of polyimide resin are orientation-processed by, for example, rubbing to restrict the orientation of the liquid crystal molecules 9 of the liquid crystal layer 8 sandwiched between the glass substrates 14 and 15.

The glass substrates 14 and 15 on which the orientation films 10 and 11 are formed are cemented together while the direction of the alignment is decided so that the molecules 9 are twisted at 260° between the substrates. As the liquid crystal material of the liquid crystal layer 8, for example, a mixed liquid crystal material is used which is formed by adding several percentages of cholesteric nonanoeito as a chiral material necessary for restricting the twist direction to nematic liquid crystal having a anisotropy of positive dielectric constant. The refractive index anisotropy Δn of the liquid crystal layer 8 is, for example, 0.143 according to the mixed liquid crystal material, and the thickness of the liquid crystal layer 8 is, for example, 6.0 μm.

The three-dimensional phase difference plates 3 and 4 have different refractive indices in the three-dimensional directions, and when the main refractive indices in the three-directions are nx, ny and nz, the refractive indices in a direction included in the plane are nx and ny (nx>ny) and the refractive index in the direction along the thickness is nz, the relationship among the refractive indices in the three directions is nx>nz>ny.

Defining the ratio of a change in retardation corresponding to a change in elevation angle of the three-dimensional phase difference plates 3 and 4 in the direction of the slow axis as a coefficient Nz=(nx−nz)/(nx−ny) using the refractive indices in the three-dimensional directions, three-dimensional phase difference plates having a coefficient Nz of 0.3 when the wavelength λ is 633 nm are used as the three-dimensional phase difference plates 3 and 4. Such three-dimensional phase difference plates 3 and 4 are realized, for example, with a polycarbonate film having a retardation value of 435 nm such as a film manufactured by Nitto Denko or a film manufactured by Sumitomo Chemical.

In order to obtain a well-balanced viewing angle characteristic in all directions, the coefficient Nz is preferably between 0.2 and 0.4. The polarizing plates 5 and 6 have a unit transmittance of, for example, 45% and a degree of polarization of, for example, 99.9%.

The light diffusing plate 7 is realized with a drawn polycarbonate film such as the HMW film manufactured by Nitto Denko. The light diffusing plate 7 of this embodiment, which is formed by drawing a polymeric material, has a phase difference. Since coloration is caused due to the phase difference in the case where the light diffusing plate 7 is disposed on the liquid crystal display device side of the polarizing plate 5, the light diffusing plate 7 is disposed on the outer side of the polarizing plate 5.

Figure 2:
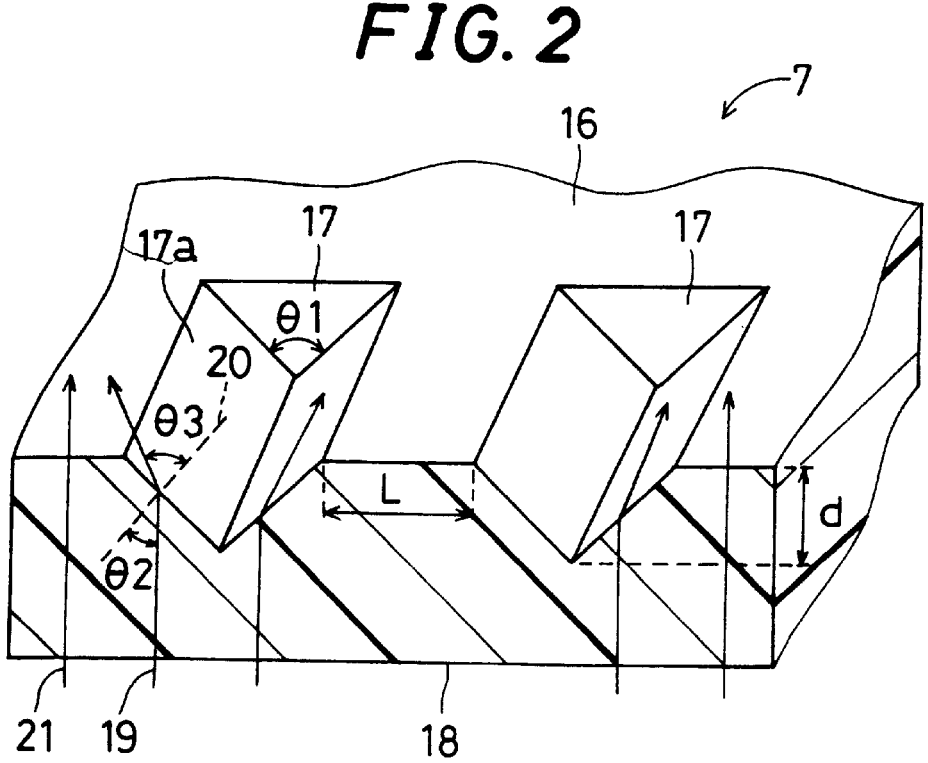
FIG. 2 is a perspective view in section of a light diffusing plate 7 according to the first embodiment.

FIG. 2 is a perspective view in section of the light diffusing plate 7. On a viewer's side surface 16 of the light diffusing plate 7 are formed a multiplicity of V-shaped and elongate recesses 17, and a liquid crystal display device side surface 18 of the light diffusing plate 7 is a smooth surface. The recesses 17 are disposed in multiplicity on the viewer's side surface 16 with their lengths being aligned in a predetermined direction. For example, the vertical angle θ1 of the recesses 17 is between 30° and 50°, the depth d of the recesses 17 is approximately 2 μm, and the distance L between adjoining recesses 17 is approximately 1 μm, so that approximately 150 thousand or more recesses 17 per $cm^2$ are uniformly distributed on the surface 16.

When, of light beams 19 and 21 vertically incident on the surface 18 of the light diffusing plate 7, the light beam 19 transmitted by the recess 17 is incident at an incident angle θ2 to an axis 20 vertical to a surface 17a of the recess 17, according to the Snell's law, the light beam 19 is diffused at an exit angle θ3 to the axis 20 which angle θ3 is different from the angle θ2. Thus, the light is diffused in a direction perpendicular to the length of the recess 17. The light beam 21 not transmitted by the recess 17 exits frontward without being refracted.

Figure 3:
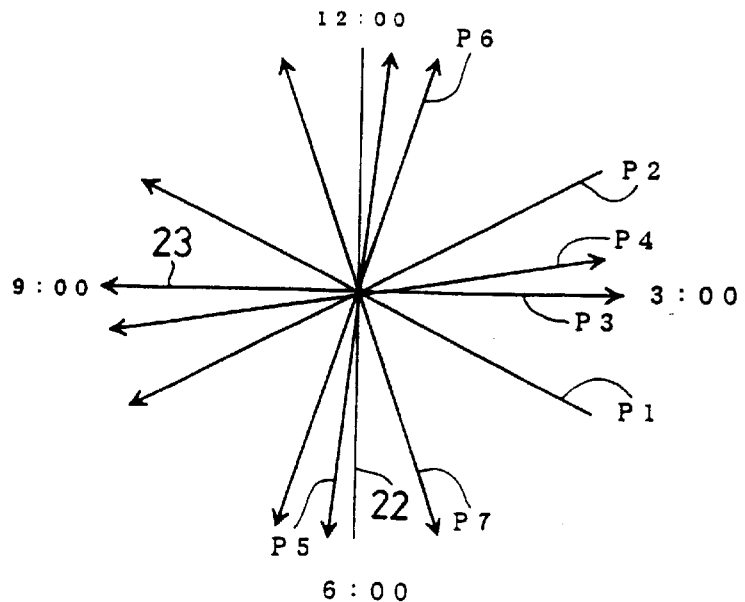
FIG. 3 shows conditions for disposing the structural members of the liquid crystal display apparatus 1.

FIG. 3 shows conditions for disposing the structural members of the liquid crystal display apparatus 1. The arrow P1 represents the axis of liquid crystal molecule orientation of the orientation film 10 formed on the glass substrate 14. The arrow P2 represents the axis of liquid crystal molecule orientation of the orientation film 11 formed on the glass substrate 15. The arrow P3 represents the direction in which the viewing angle is widened by the light diffusing plate 7, i.e. the direction orthogonal to the length of the recesses 17. The arrow P4 represents the direction of absorption angle of the polarizing plate 5. The arrow P5 represents the direction of absorption angle of the polarizing plate 6. The arrow P6 represents a slow axis direction of the three-dimensional phase difference plate 3. The arrow P7 represents a slow axis direction of the three-dimensional phase difference plate 4.

When the liquid crystal display 1 is viewed from the side of the light diffusing plate 7, with an axis 22 in the 12-6 o'clock direction (vertical direction) and an axis 23 in the 9-3 o'clock direction (horizontal direction) as the reference, the arrow P1 is disposed 40° clockwise from the axis 23, the arrow P2 is disposed 50° clockwise from the axis 22, the arrow P3 is disposed along the axis 23, the arrow P4 is disposed 85° clockwise from the axis 22, the arrow P5 is disposed 5° clockwise from the axis 22, the arrow P6 is disposed 25° clockwise from the axis 22, and the arrow P7 is disposed 25° counterclockwise from the axis 22. The angle between the slow axis direction P6 of the three-dimensional phase difference plate 3 and the viewing angle widening direction P3 of the light diffusing plate 7 is preferably between 60° and 80° in order that the viewing angle characteristic is symmetrical.

Figure 4:
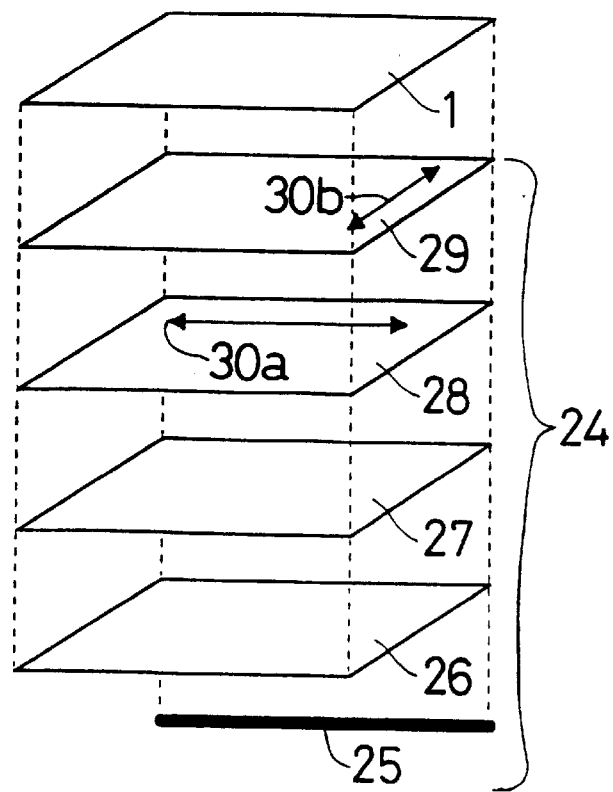
FIG. 4 is a perspective view showing the structure of a backlighting system 24.

FIG. 4 shows the structure of a backlighting system 24 used in combination with the liquid crystal display apparatus 1. The backlighting system 24 disposed, for example, directly under the liquid crystal display apparatus includes a light source 25, a light director 26, a sheet diffusing plate 27 and prism sheets 28 and 29.

The light source 25 realized, for example, with a cold cathode-ray tube is disposed parallel to the length of the liquid crystal display apparatus 1. The light director 26 formed of an acrylic plate is disposed on the liquid crystal display apparatus side of the light source 25. The sheet diffusing plate 27 formed of polycarbonate or polyethylene telephthalate is disposed on the liquid crystal display apparatus side of the light director 26. The upper surface of the sheet diffusing plate 27 is a prism surface where a multiplicity of V-shaped stripe grooves are formed in parallel with one another.

The prism sheets 28 and 29 formed of acrylic resin or polyethylene telephthalate are disposed between the sheet diffusing plate 27 and the liquid crystal display apparatus 1. In the sheet diffusing plate side prism sheet 28, a groove is formed in parallel with a direction 30a of the length, and in the liquid crystal display apparatus side prism sheet 29, a groove is formed in parallel with a direction 30b inclined approximately 5° rightward from the direction of the width orthogonal to the length 30a in order to prevent the interference between the panel and the light.

Subsequently, an operation of a combination of the liquid crystal display apparatus 1 and the backlighting system 24 will be described. In the backlighting system 24, the cold cathode-ray tube used as the light source 25 is a line source, so that the emitted light is not uniform and the luminance decreases as the light becomes away from the light source 25. Therefore, using the multiple reflection in the light director 26, the light continuously emitted from the light source 25 is uniformly directed to the entire surface by the light director 26. The light directed to the entire surface is diffused by the sheet diffusing plate 27 and exits frontward. The light converted from the light of the line source into the light of the surface illuminant by the light director 26 and the sheet diffusing plate 27 illuminates the light incident surface of the liquid crystal display apparatus 1 as uniform light.

In order to increase the front luminance, the light converted into the light of the surface illuminant is transmitted by the prism sheets 28 and 29 before reaching the liquid crystal display apparatus 1. The prism sheets 28 and 29 provide the light of the surface illuminant emitted from the sheet diffusing plate 27 with a directivity by the directions 30a and 30b of the grooves formed in the prism sheets to increase the front luminance and causes the light to illuminate the liquid crystal display apparatus 1.

While the prism sheets 28 and 29 are disposed in order to increase the front luminance, the viewing angle narrows because the diffusion of the light by the prism sheets 28 and 29 depends on the vertical angle of the grooves of the sheets. In this embodiment, by disposing in an optimum manner in the liquid crystal display apparatus 1 the light diffusing plate 7 and the three-dimensional phase difference plates 3 and 4 whose refractive indices in the three-dimensional directions are controlled, the viewing angle is widened to improve the viewing angle characteristic.

In the liquid crystal display apparatus 1, the light from the backlighting system 24 illuminating the polarizing plate 6 is divided into two polarization elements orthogonal to each other. With one of the elements being absorbed or dispersed, only the light of the other element is transmitted. The light transmitted by the polarizing plate 6 is incident on the three-dimensional phase difference plate 4. The three-dimensional phase difference plate capable of controlling the change in retardation corresponding to the elevation angle in the slow axis direction widens the viewing angle more than the two-dimensional phase difference plate by changing the coefficient Nz. Therefore, by the light being transmitted by the three-dimensional phase difference plate 4, the viewing angle in the 12-6 o'clock direction is improved.

When no voltage is applied, the liquid crystal molecules 9 in the liquid crystal layer 8 are twisted by the orientation films 10 and 11. The light incident on the glass substrate 15 is twisted by the optical rotatory power of the light according to the orientation of the liquid crystal molecules 9 having optical anisotropy and is then transmitted by the glass substrate 14. With respect to the light transmitted by the glass substrate 14, the viewing angle in the 12-6 o'clock direction is improved by the three-dimensional phase difference plate 3 in a similar manner to the three-dimensional phase difference plate 4. The light transmitted by the three-dimensional phase difference plate 3 is, for example, transmitted by the polarizing plate 5.

When a voltage is applied between the transparent electrodes 12 and 13 to create an electric field in the liquid crystal layer 8, the liquid crystal molecules 9 are rearranged so that their lengths are vertical to the glass substrates 14 and 15. The orientation of the rearranged liquid crystal molecules 9 is different from that when no voltage is applied, so that the light incident on the polarizing plate 6 is blocked by the polarizing plate 5. Images are displayed by thus controlling whether to transmit or block the incident light by the electric field.

The light transmitted by the polarizing plate 5 is diffused in the 9-3 o'clock direction by the light diffusing plate 7. Since the light vertically incident on the portion of the light diffusing plate 7 where no recesses 17 are formed exits without begin diffused, the front contrast is prevented from degrading. As described above, the light incident on the portion of the light diffusing plate 7 where the recesses 17 are formed is diffused according to the Snell's law in the 9-3 o'clock direction where the viewing angle is not improved by the three-dimensional phase difference plates 3 and 4.

By thus optimizing the conditions for disposing the structural members, the direction in which the viewing angle is widened by the light diffusing plate 7 and the direction in which the viewing angle is widened by the three-dimensional phase difference plates 3 and 4 are well-balanced, so that the viewing angle is widened in all directions with a sufficient front contrast being ensured.

Figure 5:
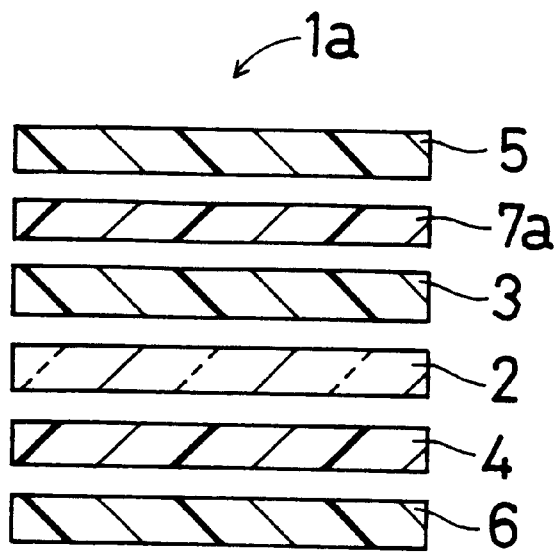
FIG. 5 is a sectional view showing the structure of a liquid crystal display apparatus 1a according to a second embodiment of the invention.

FIG. 5 is a sectional view showing the structure of a liquid crystal display apparatus 1a according to a second embodiment of the invention. Like the liquid crystal display apparatus 1, the liquid crystal display apparatus 1a includes the liquid crystal display device 2, the phase difference plates 3 and 4, the polarizing plates 5 and 6, and a light diffusing plate 7a. The structure other than the light diffusing plate 7a is similar to that of FIG. 1. Structural members, axes of disposition, conditions for disposing the structural members and the disposition of the backlighting system are similar to those of the first embodiment. What is different from the first embodiment is that the light diffusing plate 7a having no phase difference is sandwiched between the polarizing plate 5 and the three-dimensional phase difference plate 3 so as to be protected, for example, from external shocks. Thus, in the liquid crystal display apparatus 1a, the structural members are layered in the order of the polarizing plate 5, the light diffusing plate 7a, the three-dimensional phase difference plate 3, the liquid crystal display device 2, the three-dimensional phase difference plate 4 and the polarizing plate 6 from the viewer's side.

Figure 6:
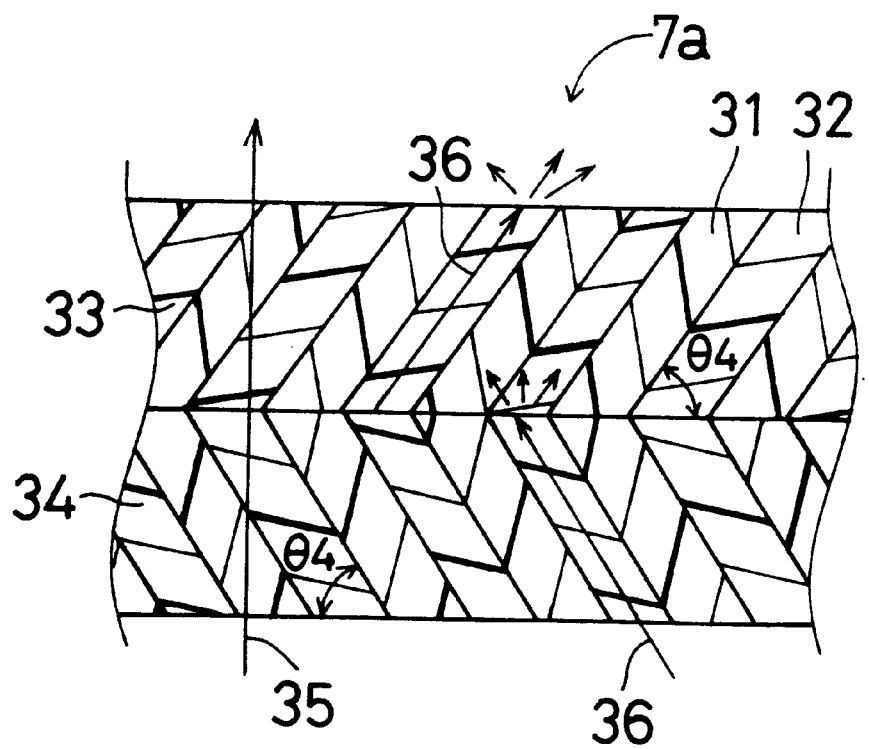
FIG. 6 is a sectional view of a light diffusing plate 7a according to the second embodiment.

FIG. 6 is a sectional view of the light diffusing plate 7a. The light diffusing plate 7a is formed by laminating two films 33 and 34 (e.g., films under a trade name of Lumisty manufactured by Sumitomo Chemical Co., Ltd.) having two kinds of regions 31 and 32 having different refractive indices. The regions 31 and 32 are provided in parallel with a direction inclined at a predetermined angle θ4 to a direction 35 of the normal of the films. The predetermined angles θ4 of the films 33 and 34 are set in opposite directions with respect to the direction 35 of the normal of the films. The films 33 and 34 may be disposed so that regions having the same refractive index face each other or so that regions having different refractive indices face each other. In either case, the same results are obtained. The angle θ4 is preferably between 55° and 75°. In this embodiment, the angle θ4 is 65°.

The light incident on the light diffusing plate 7a from the direction 35 exits in the direction 35 without being diffused to ensure a sufficient front contrast. A light beam 36 incident on the light diffusing plate 7a in parallel with the angle θ4 is diffused according to the Bragg diffraction to widen the viewing angle in the 9-3 o'clock direction. The films 33 and 34 are capable of widening the viewing angle only with respect to light incident in one direction. Therefore, the films 33 and 34 are laminated to widen the viewing angle in the 9-3 o'clock direction.

Figure 7:
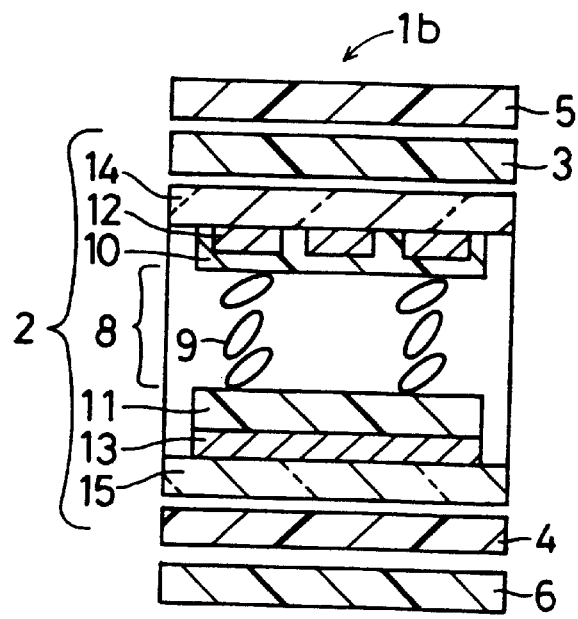
FIG. 7 is a sectional view showing the structure of a liquid crystal display apparatus 1b according to a first comparative example.

FIG. 7 is a sectional view showing the structure of a liquid crystal display apparatus 1b according to a first comparative example. The liquid crystal display apparatus 1b includes the liquid crystal display device 2, the three-dimensional phase difference plates 3 and 4, and the polarizing plates 5 and 6. Structural members, axes of disposition and the disposition of the backlighting system are similar to those of the first embodiment. What is different from the first embodiment is that the light diffusing plate 7 is not provided.

Figure 8:
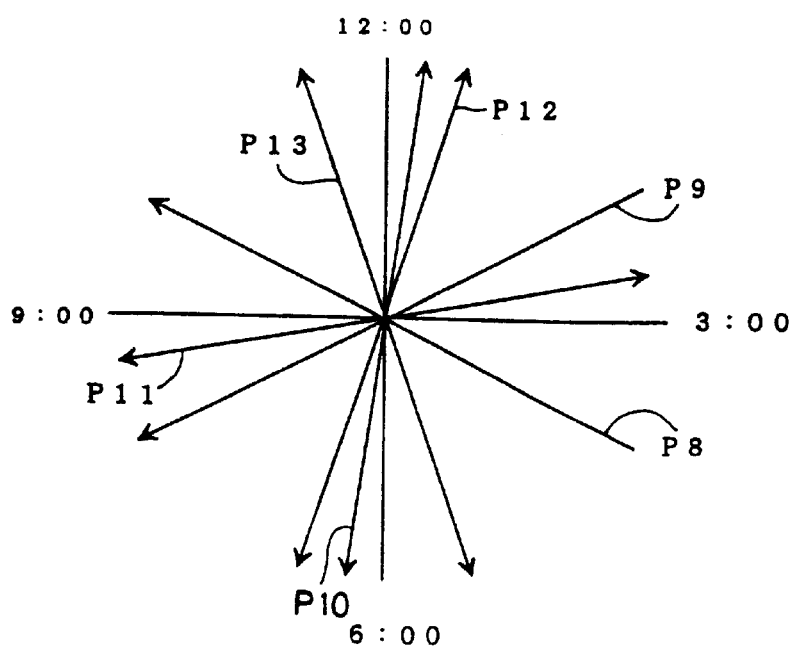
FIG. 8 shows conditions for disposing the structural members of the liquid crystal display apparatus 1b.

FIG. 8 shows conditions for disposing the structural members of the liquid crystal display apparatus 1b. The arrow P8 represents the axis of liquid crystal molecule orientation of the orientation film 10 formed on the glass substrate 14. The arrow P9 represents the axis of liquid crystal molecule orientation of the orientation film 11 formed on the glass substrate 15. The arrow P10 represents the direction of absorption angle of the polarizing plate 5. The arrow P11 represents the direction of absorption angle of the polarizing plate 6. The arrow P12 represents a slow axis direction of the three-dimensional phase difference plate 3. The arrow P13 represents the slow axis direction of the three-dimensional phase difference plate 4. The conditions for disposing the structural members are similar to those of the first embodiment.

Figure 9:
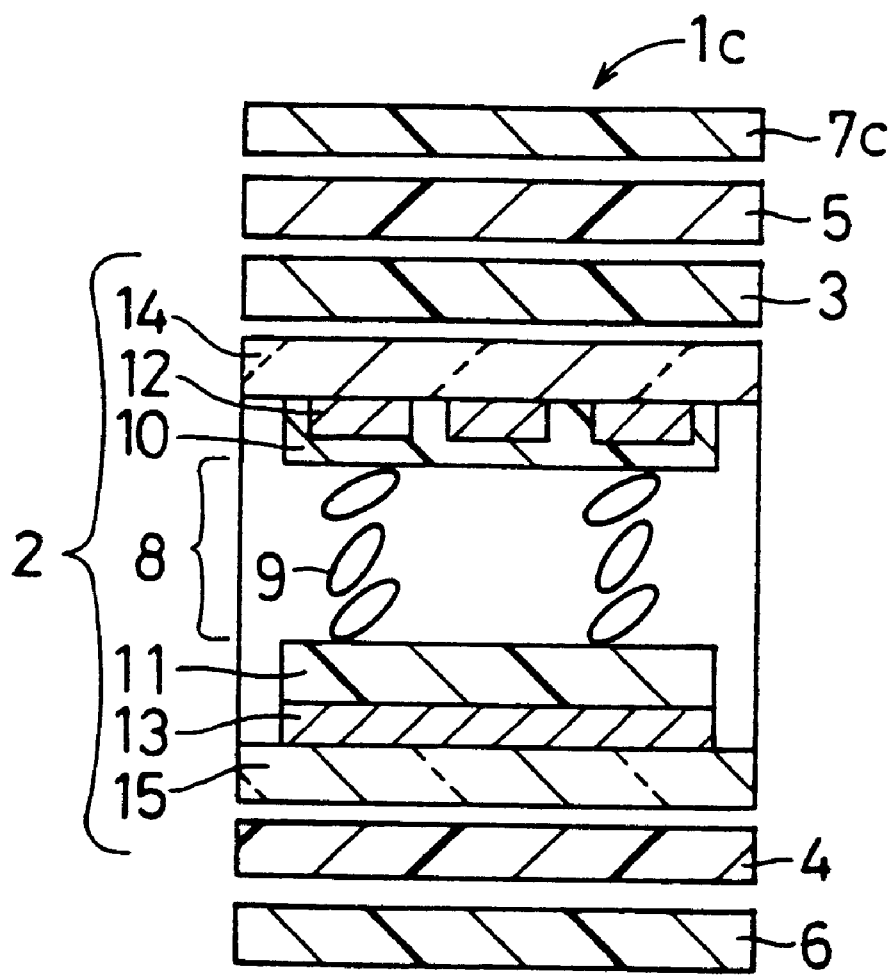
FIG. 9 is a sectional view showing the structure of a liquid crystal display apparatus 1c according to a second comparative example.

FIG. 9 is a sectional view showing the structure of a liquid crystal display apparatus 1c according to a second comparative example. Like the first embodiment, the liquid crystal display apparatus 1c includes the liquid crystal display device 2, the three-dimensional phase difference plates 3 and 4, the polarizing plates 5 and 6, and a light diffusing plate 7c. Structural members, axes of disposition and the disposition of the backlighting system are similar to those of the first embodiment. What is different from the first embodiment is that the light diffusing plate 7c is a film having no directivity and diffuses the light in all directions to widen the viewing angle. Conditions for disposing the structural members are similar to those of the first embodiment.

Subsequently, results of viewing angle characteristic evaluations of the first and second embodiments and the first comparative example will be described with reference to isocontrast curves.

FIGS. 10A through 10F graphically show isocontrast curves of the first embodiment and the first comparative example where the contrast Co is 4. Inside the curve is a range where Co>4 and outside the curve is a range where Co<4. In the isocontrast curves, the 12 o'clock position on the display screen represents 0°, the 3 o'clock position represents 90°, the 6 o'clock position represents 180°, and the 9 o'clock position represents 270°. Letting the central point of the isocontrast curves be 0° in a direction vertical to the display screen, the inclination of the viewing angle range from 0° to 50° is shown by a circle drawn radially from the center of the circle.

Figure 10A:
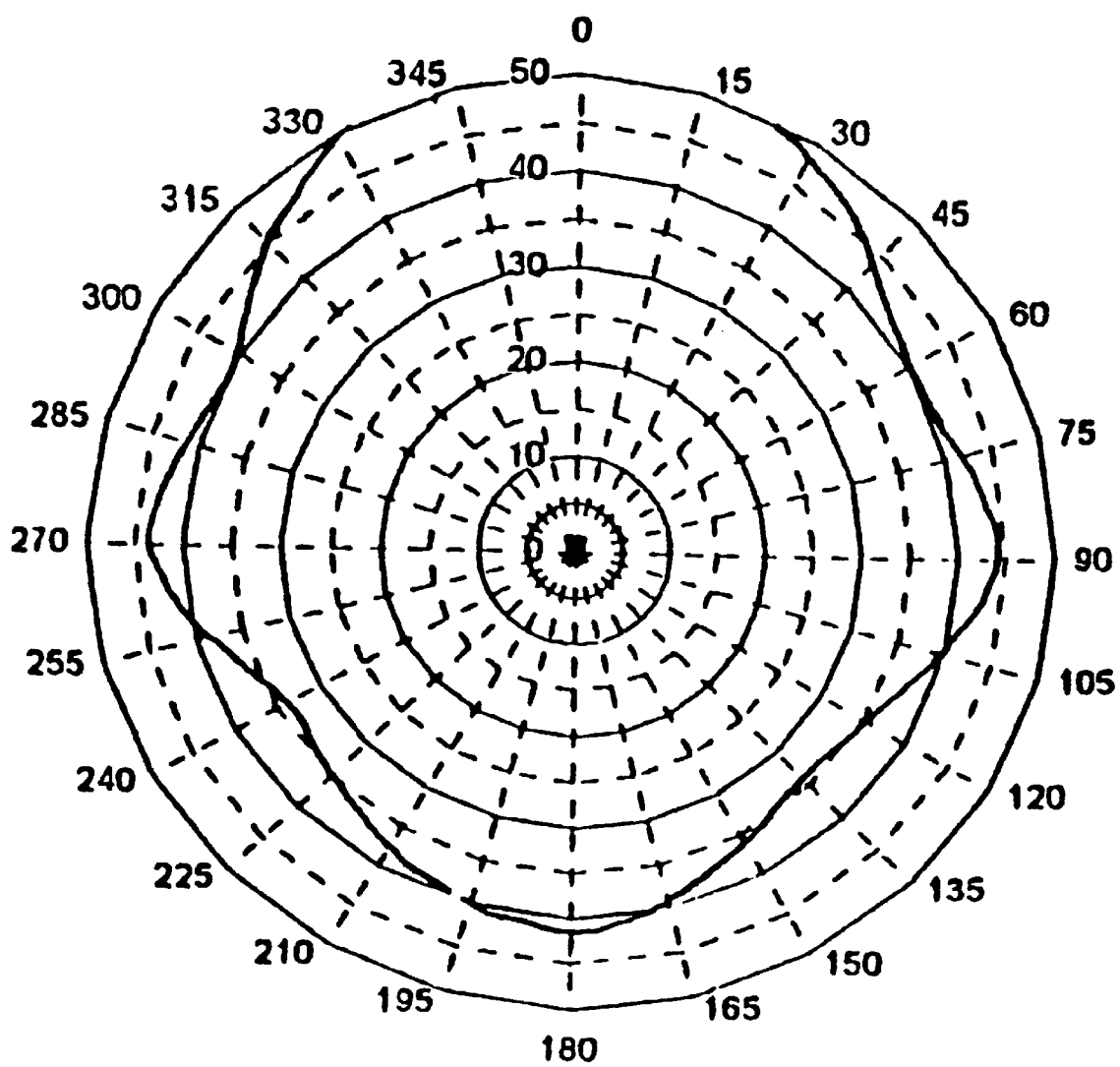
FIGS. 10A through 10F graphically show isocontrast curves where a contrast Co is 4 in the case where a coefficient Nz of three-dimensional phase difference plates 3 and 4 of the first embodiment is varied and in the first comparative example.
Figure 10B:
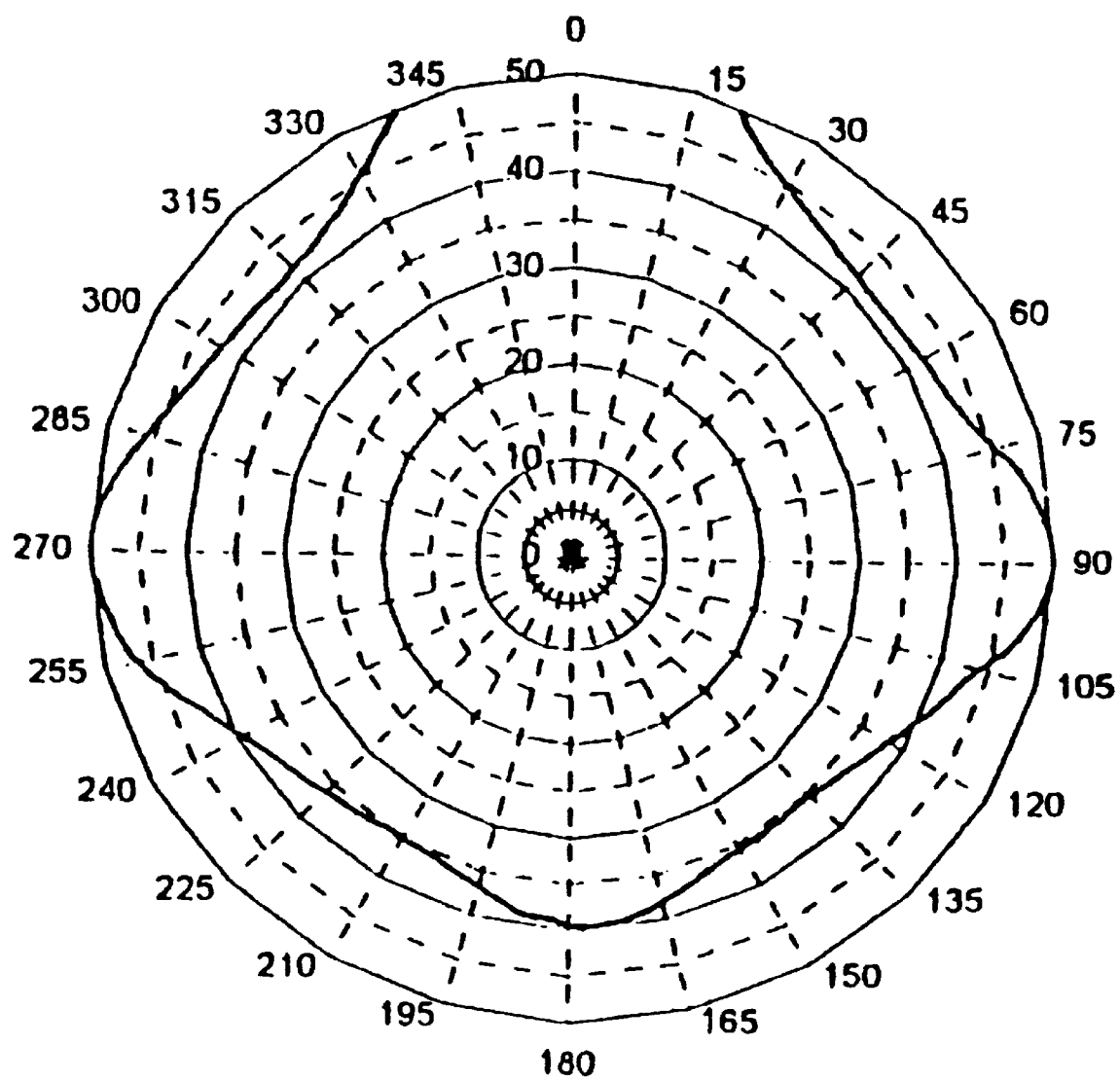
Figure 10C:
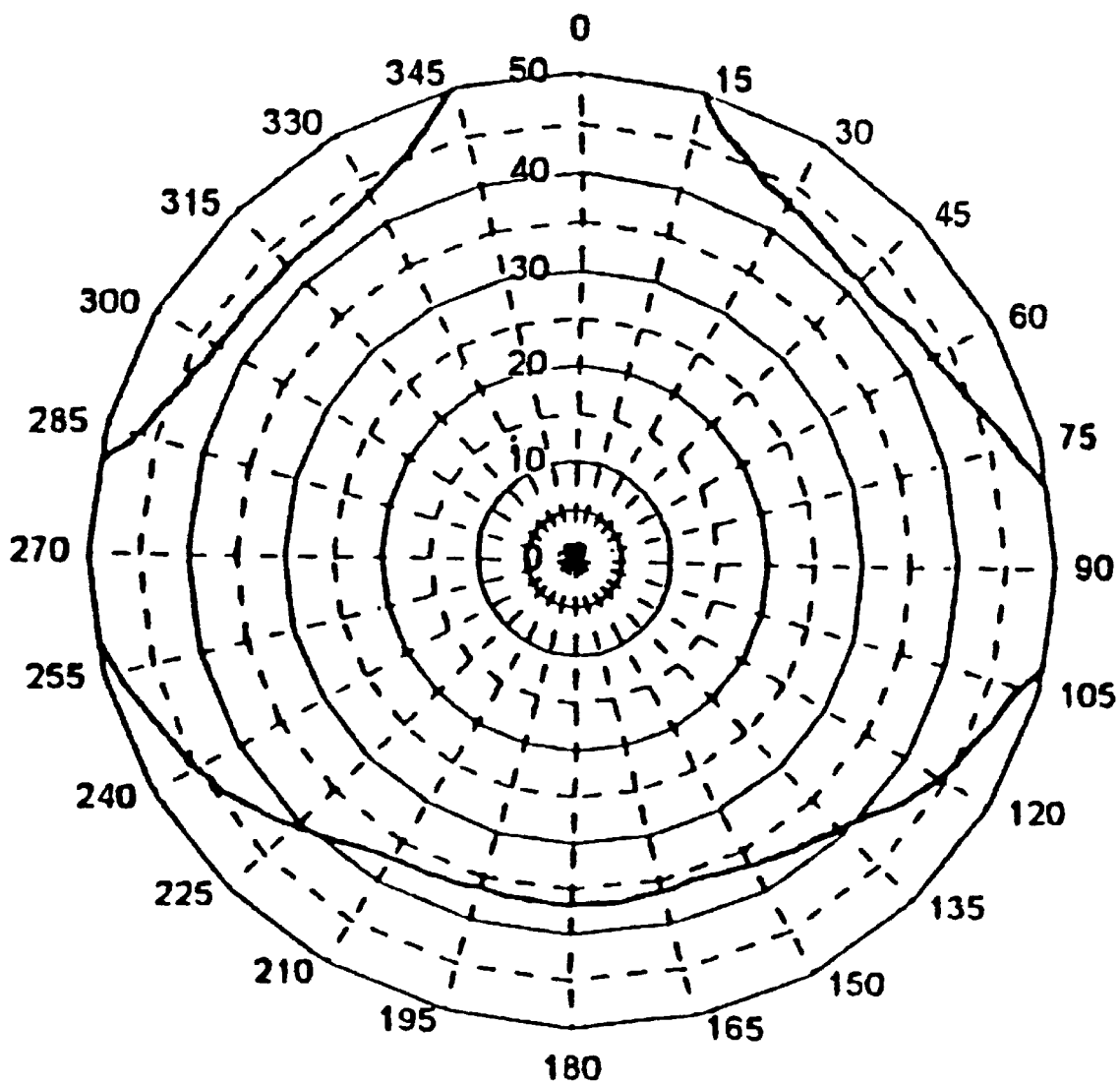
Figure 10D:
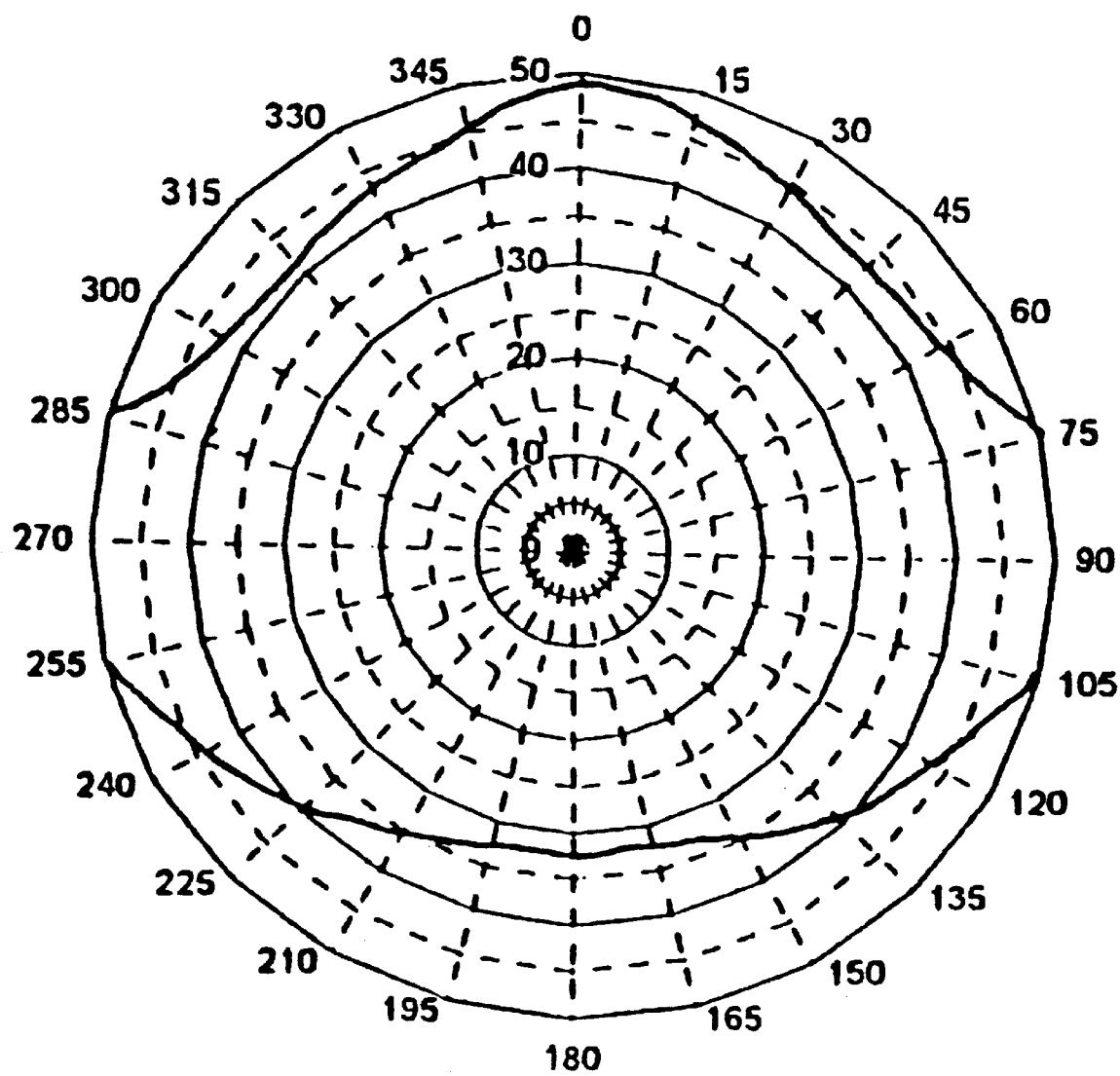
Figure 10E:
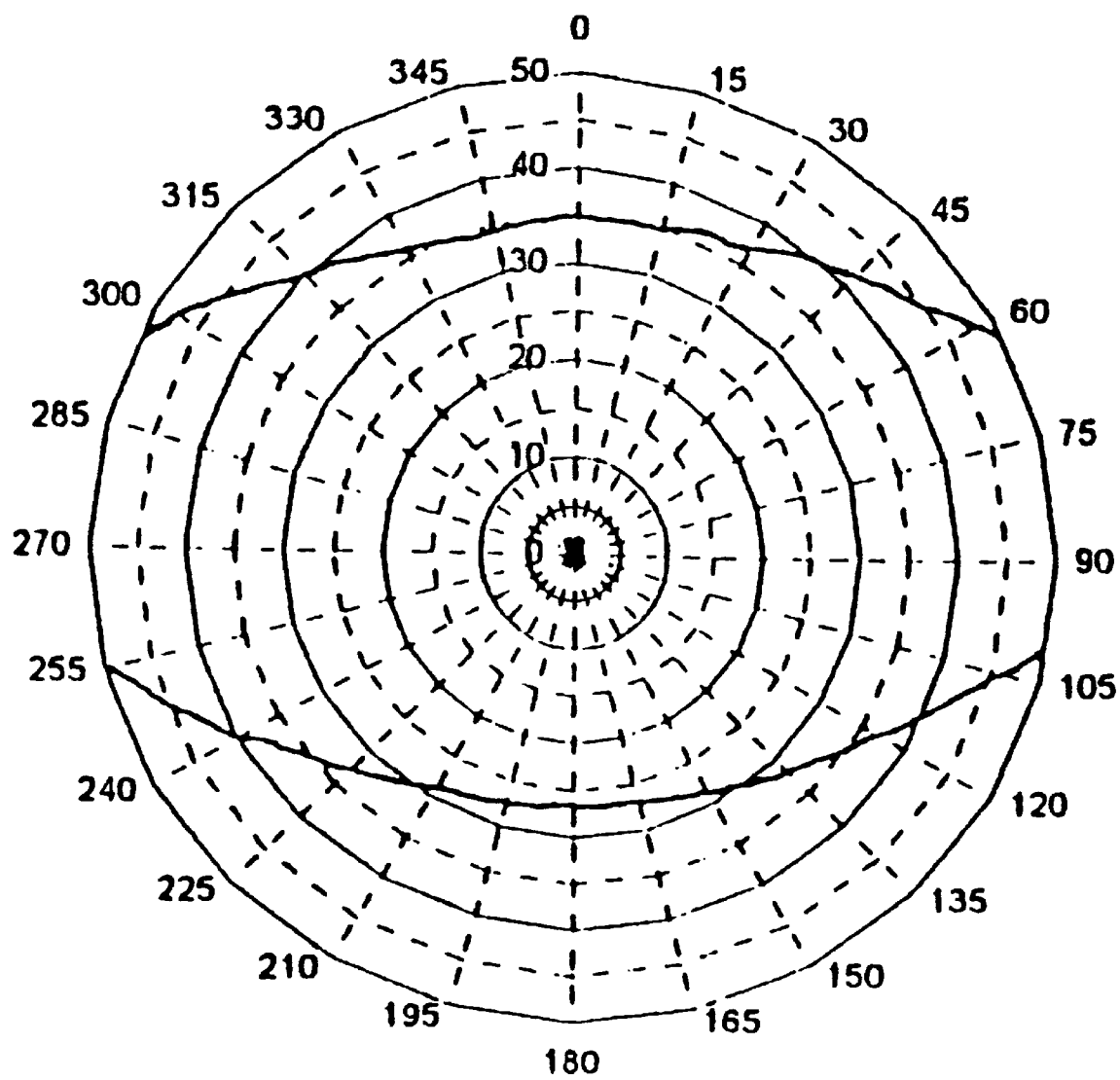
Figure 10F:
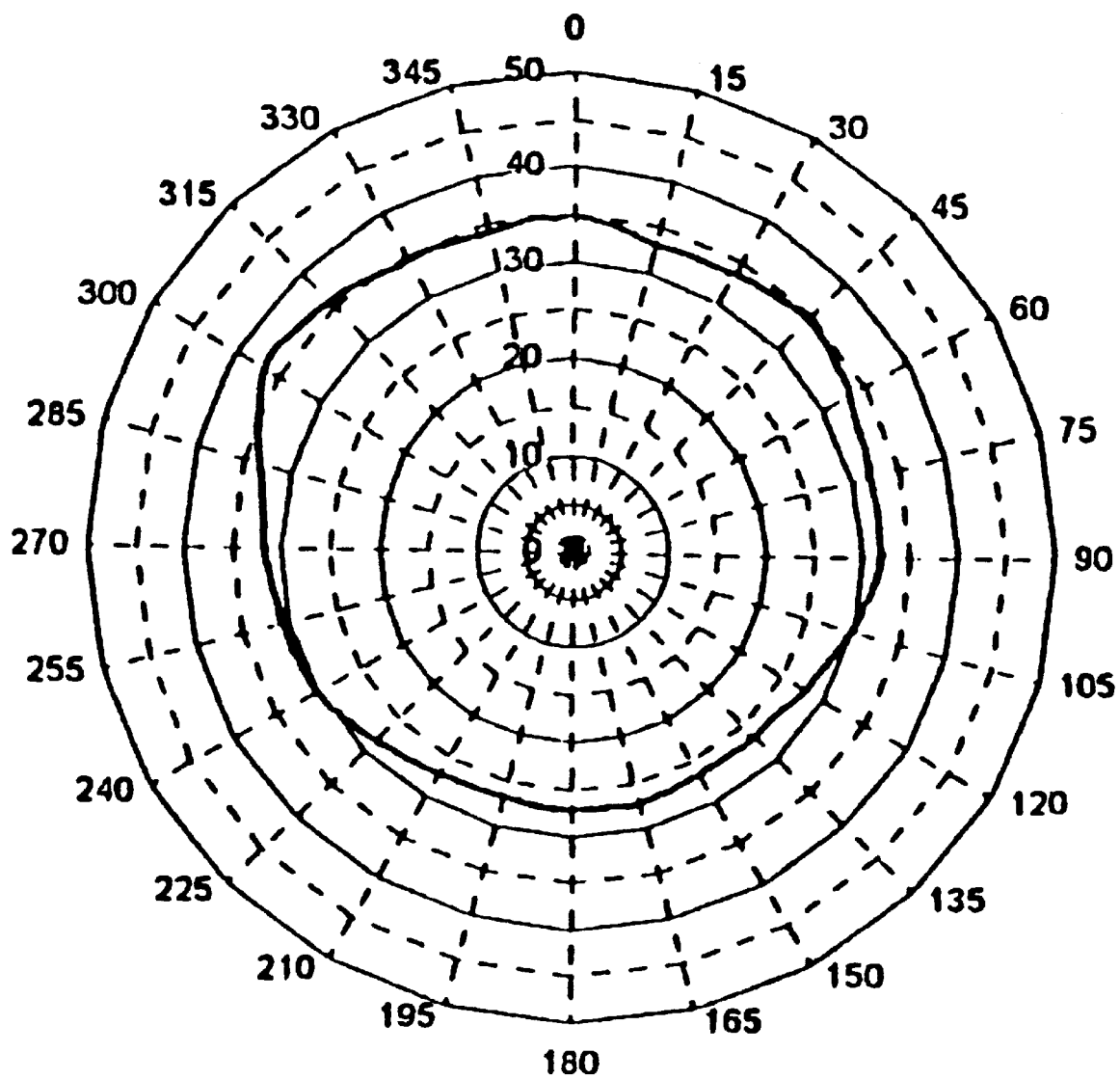
Figure 11A:
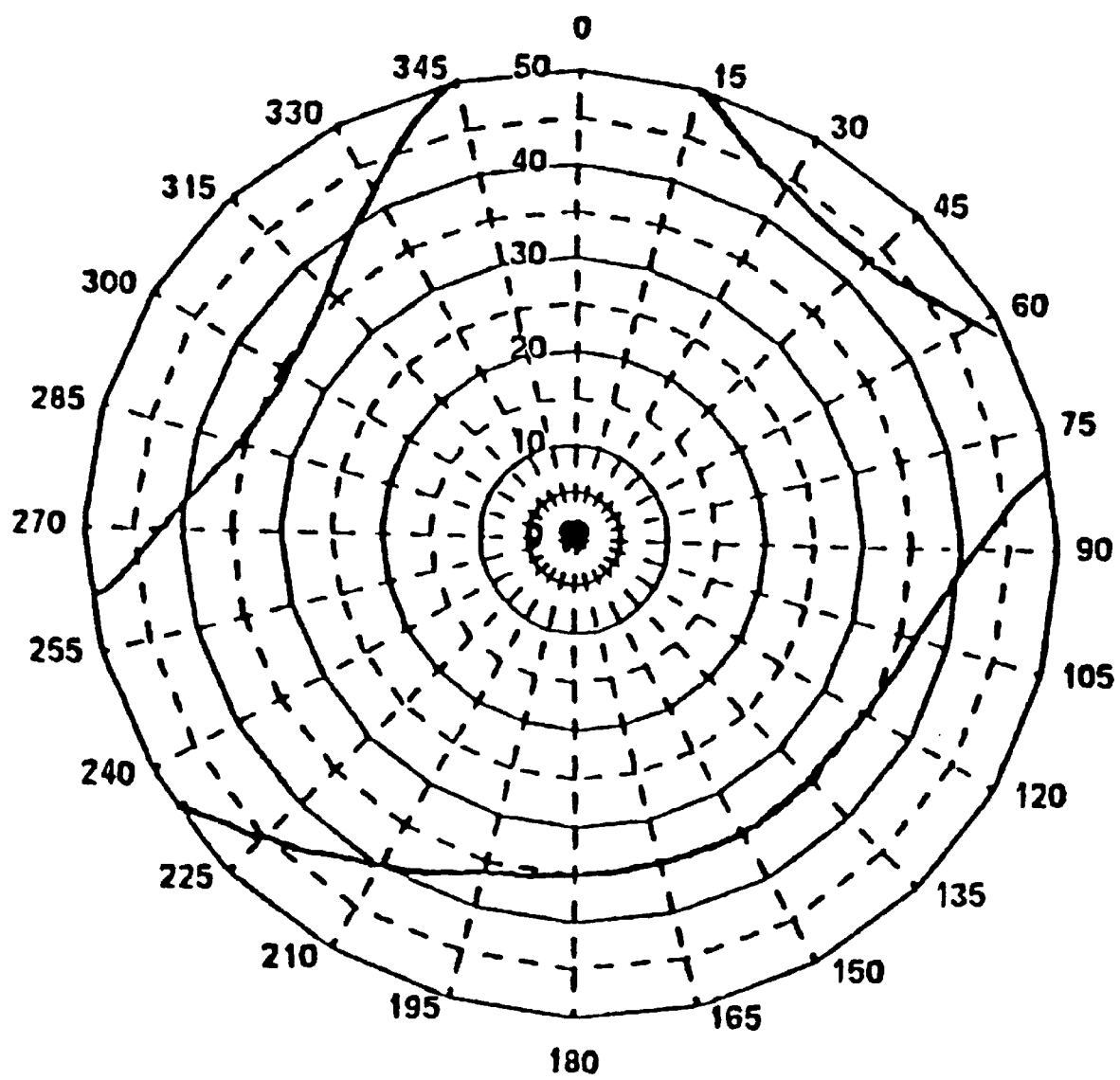
FIGS. 11A through 11E graphically show isocontrast curves where the contrast Co is 4 when the angle of intersection between a slow axis direction P6 of the three-dimensional phase difference plate 3 and a viewing angle widening direction P3 of the light diffusing plate 7 is varied in the case where the coefficient Nz of the three-dimensional phase difference plates 3 and 4 of the first embodiment is 0.3.
Figure 11B:
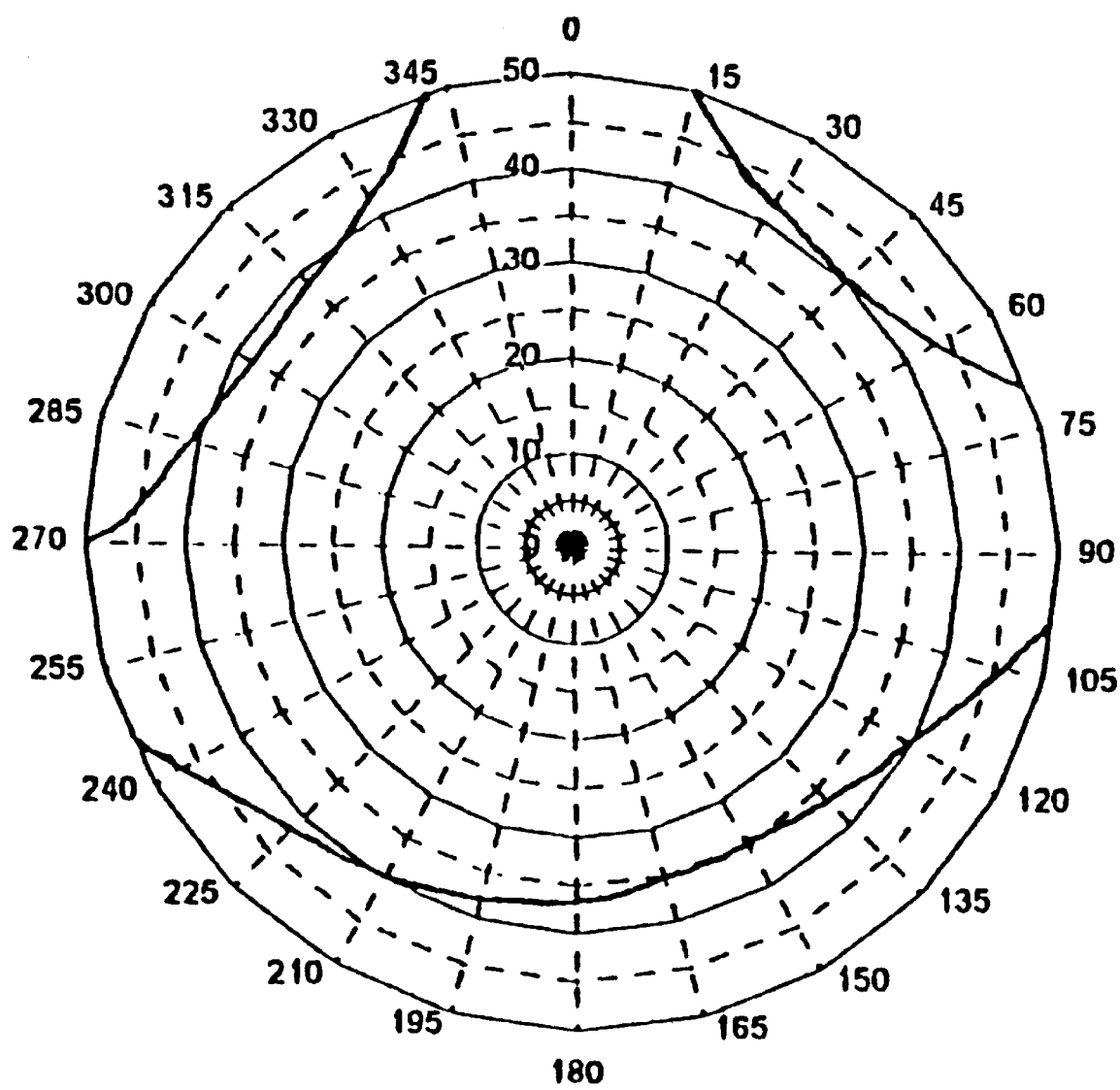
Figure 11C:
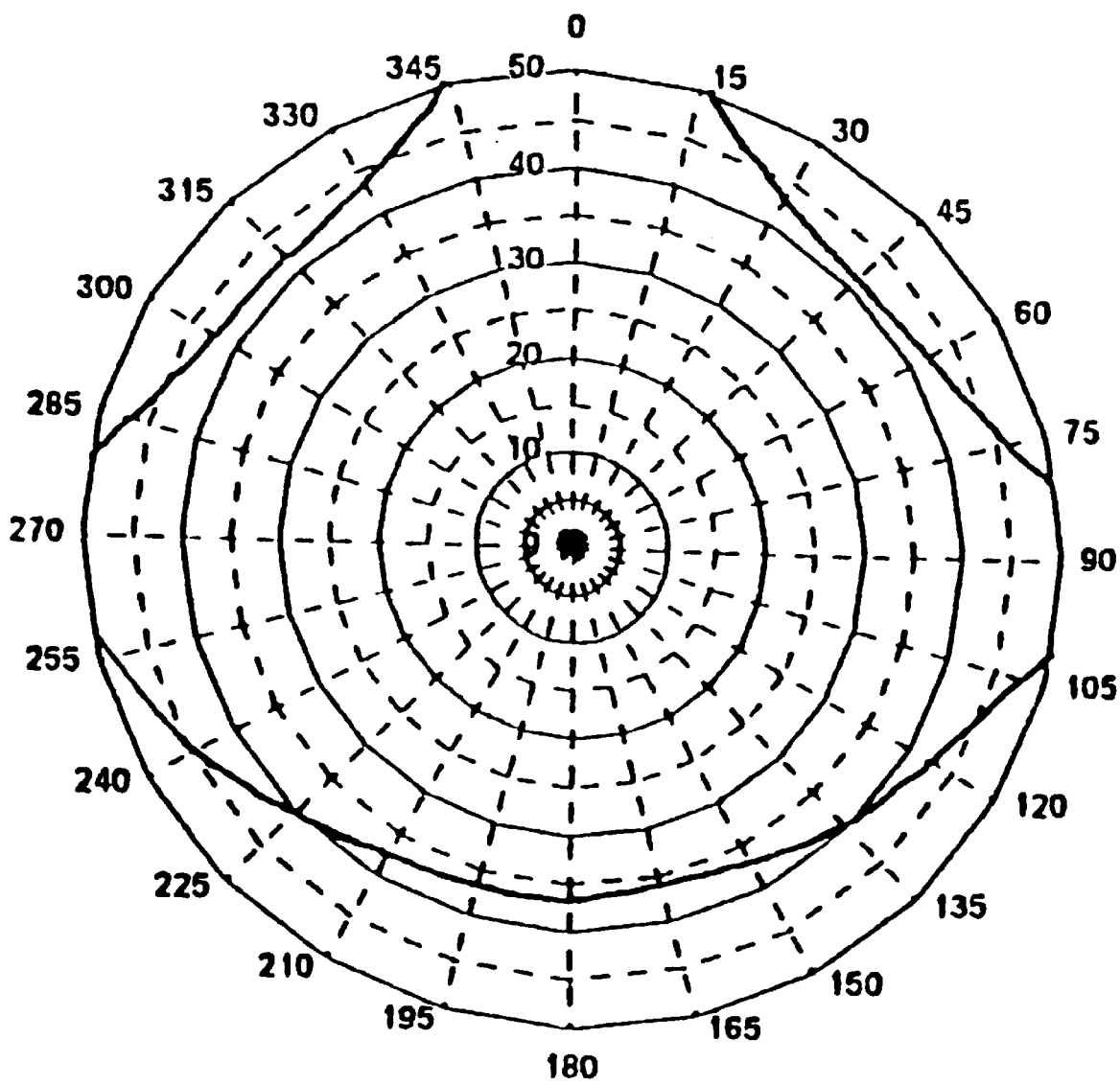
Figure 11D:
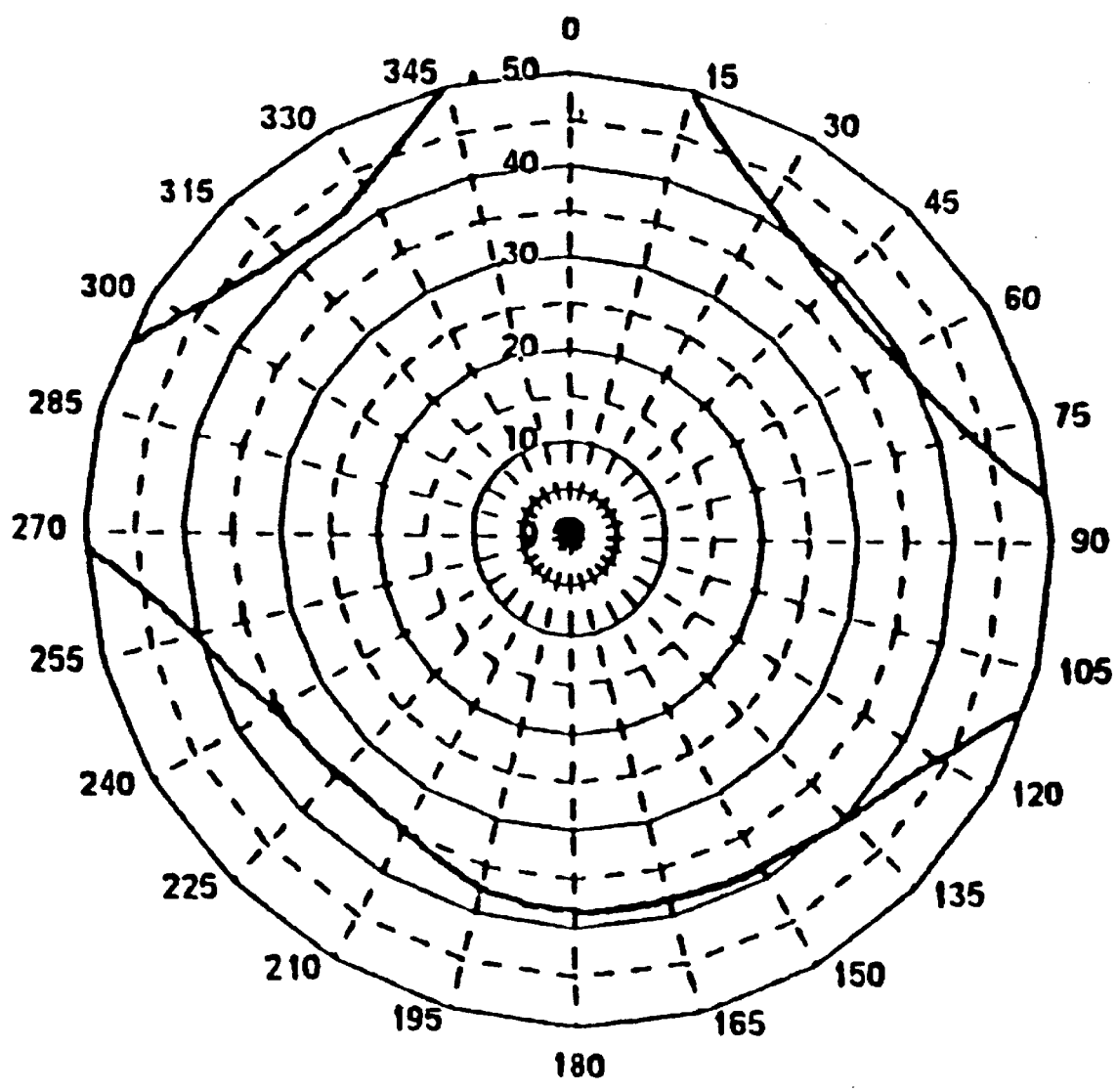
Figure 11E:
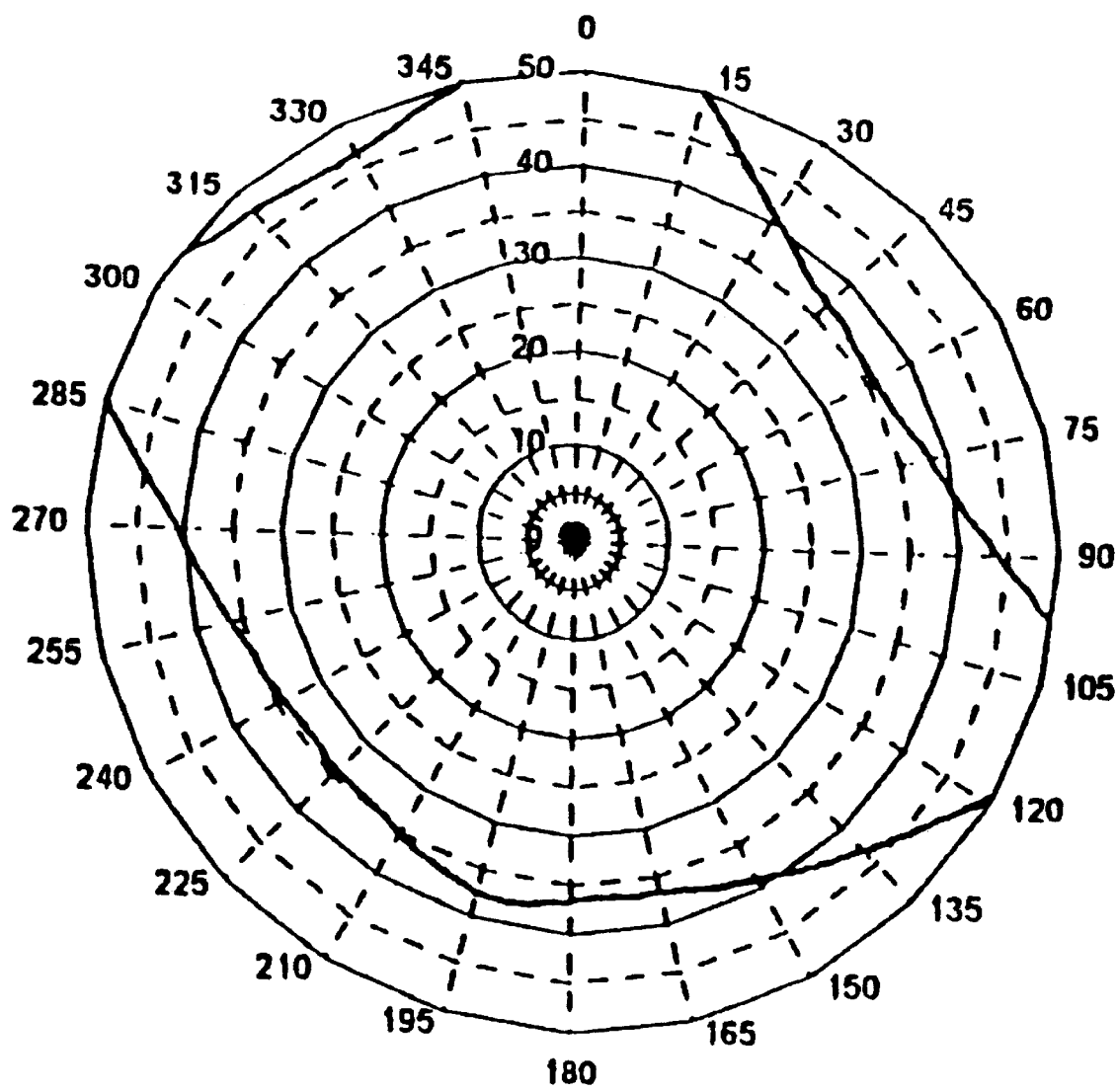
Figure 12B:
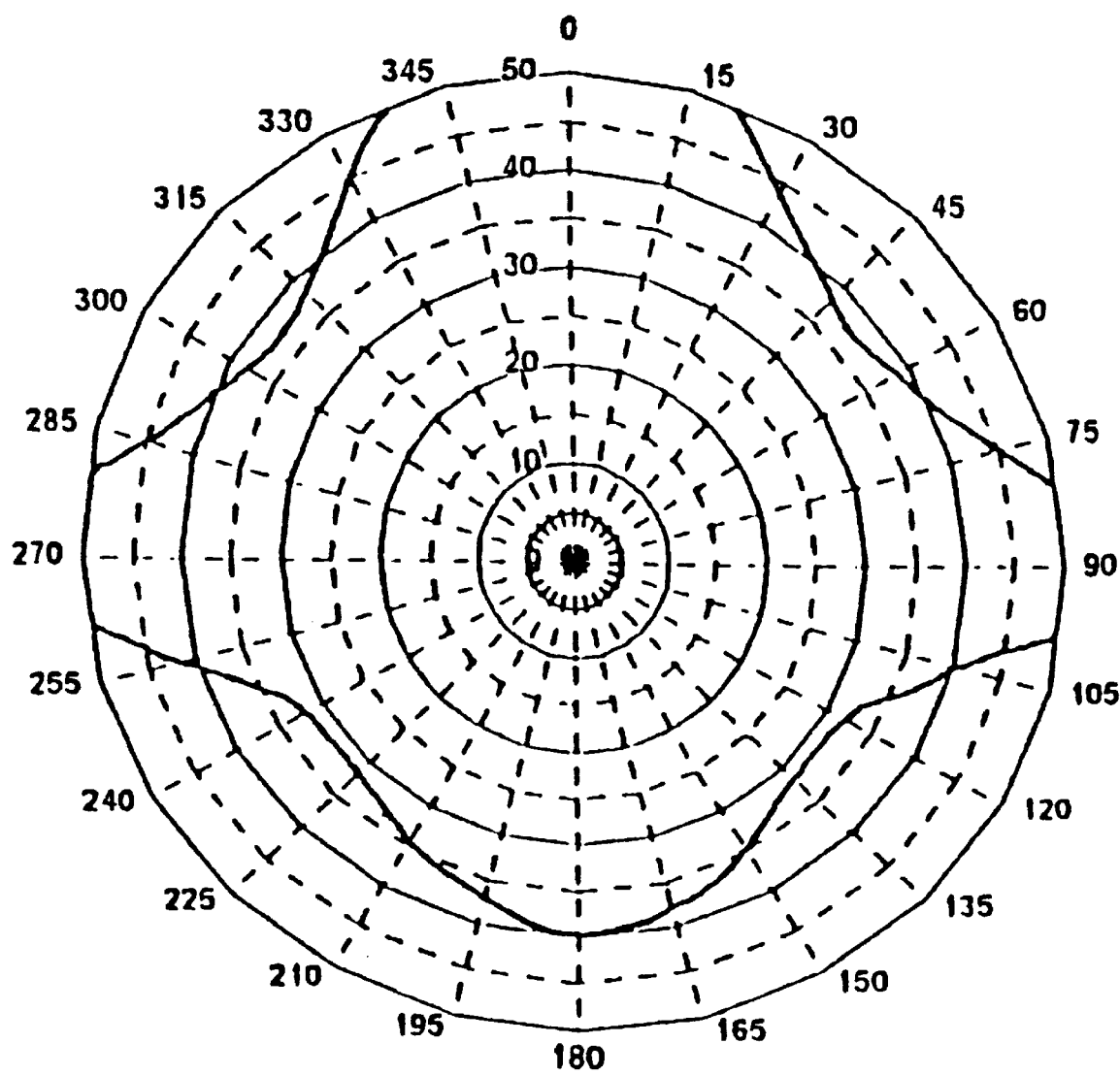
Figure 12C:
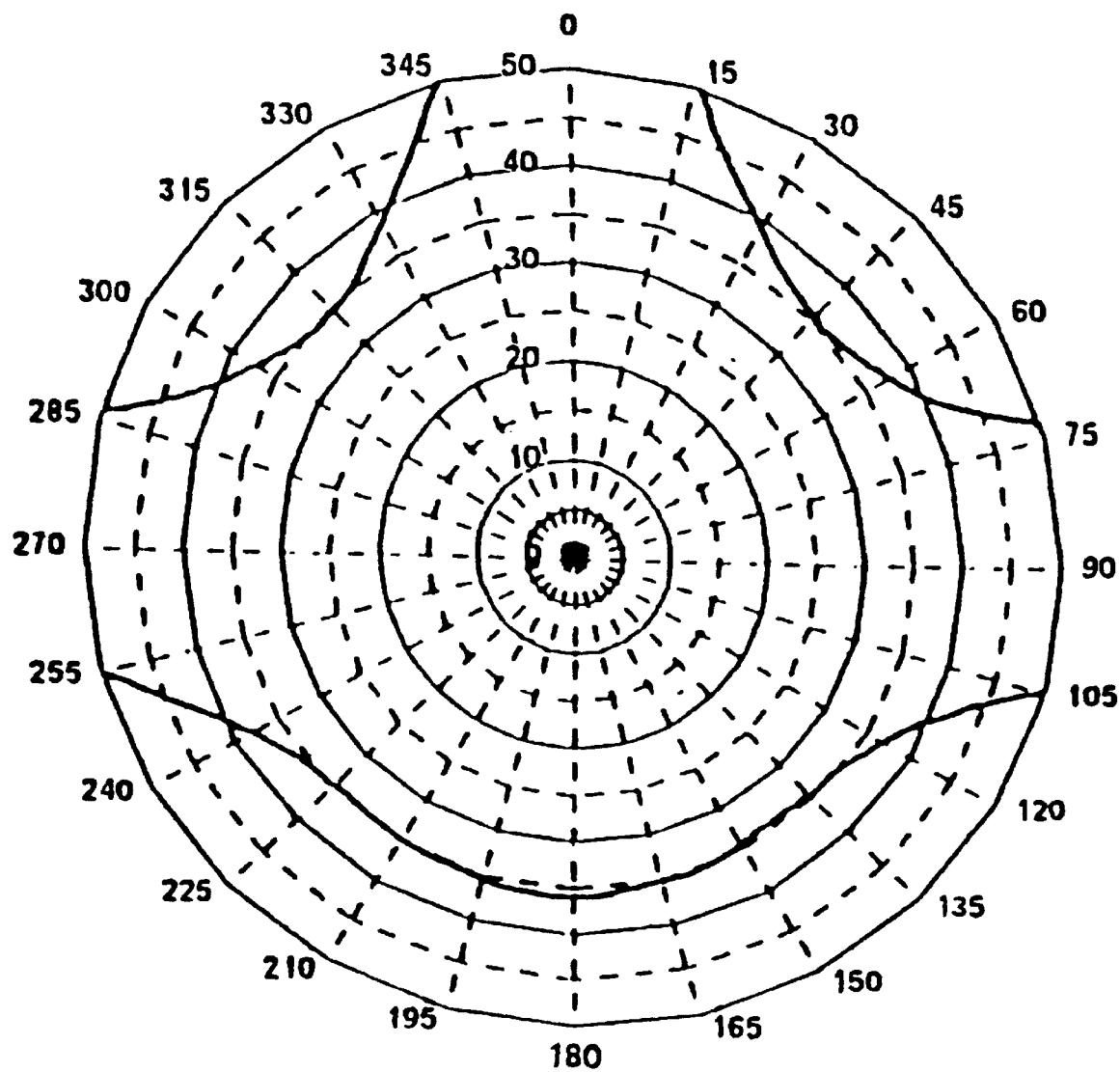
Figure 12D:
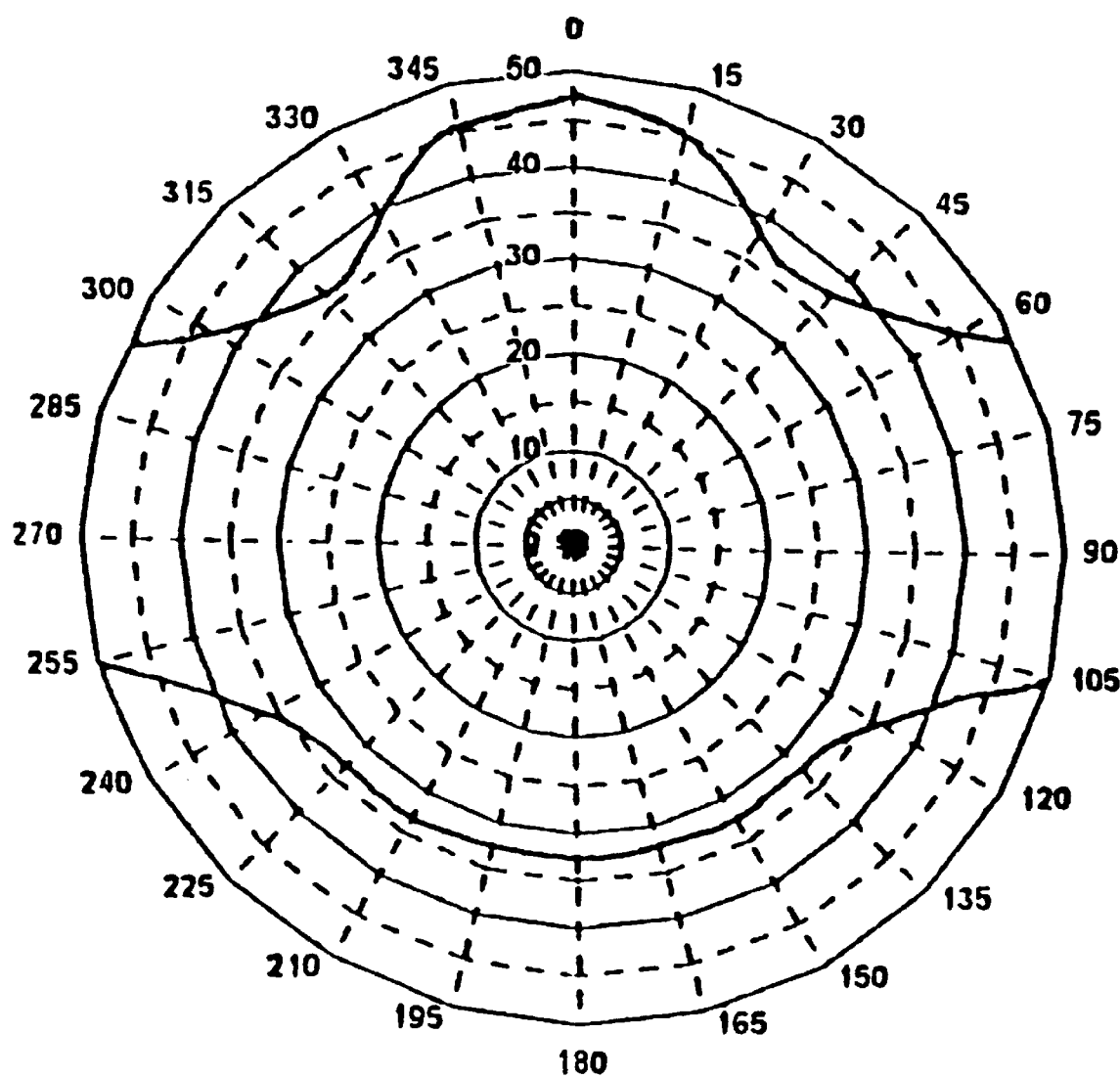
Figure 12E:
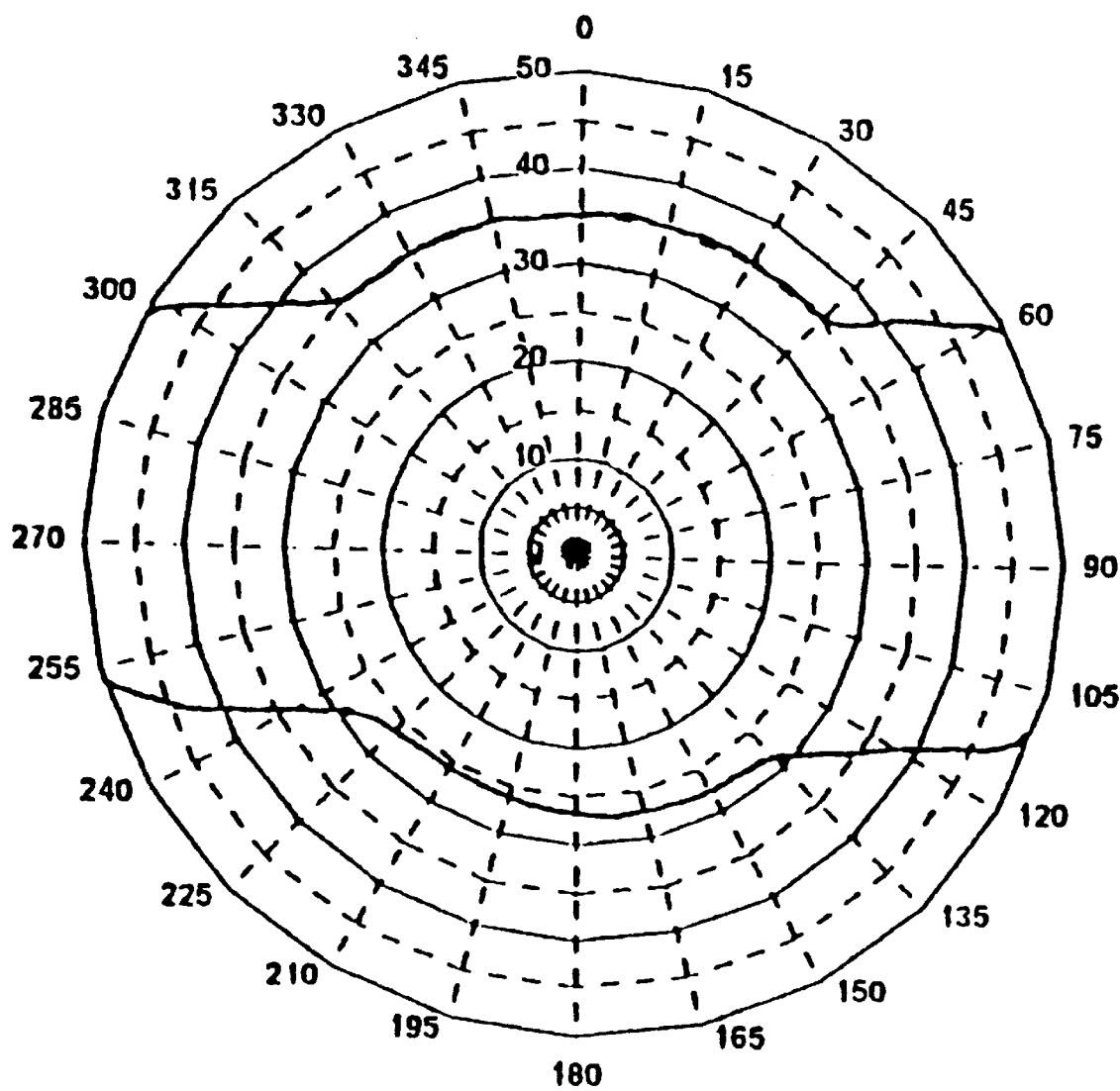

FIGS. 10A to 10E show results obtained when the coefficient Nz of the three-dimensional phase difference plates 3 and 4 are varied by 0.1 from 0.1 to 0.5 in the first embodiment. FIG. 10F shows a result of the first comparative example. It is apparent that the range of the viewing angle is wider in the first embodiment shown in FIGS. 10A to 10E provided with the light diffusing plate 7 than in the first comparative example shown in FIG. 10F provided with no light diffusing plate 7. It is also apparent that a well-balanced viewing angle characteristic is obtained in all directions when the coefficient Nz is between 0.2 and 0.4. Therefore, the coefficient Nz is preferably between 0.2 and 0.4.

FIGS. 11A through 11E graphically show isocontrast curves where the contrast Co is 4 when the angle of intersection between the slow axis direction P6 of the three-dimensional phase difference plate 3 and the viewing angle widening direction P3 of the light diffusing plate 7 is varied in the case where the coefficient Nz of the three-dimensional phase difference plates 3 and 4 is 0.3 in the liquid crystal display apparatus 1 according to the first embodiment. FIGS. 11A to 11E show results obtained when the angle of intersection is varied by 10° from 50° to 90°. It is apparent that symmetrical isocontrast curves are obtained when the angle of intersection is between 60° and 80°. It is also apparent that ill-balanced isocontrast curves are obtained when the angle of intersection is 50° and 90°. Therefore, to obtain an excellent viewing angle characteristic, the angle of intersection is preferably between 60° and 80° where the viewing angle characteristic is symmetrical.

FIGS. 12A through 12E graphically show isocontrast curves where the contrast Co is 4 when the coefficient Nz of the three-dimensional phase difference plates 3 and 4 is varied in the liquid crystal display apparatus 1a according to the second embodiment. FIGS. 12A to 12E show results obtained when the coefficient Nz is varied by 0.1 from 0.1 to 0.5. Similarly to the results shown in FIGS. 10A through 10F, it is apparent that a well-balanced viewing angle characteristic is obtained in all directions when the coefficient Nz is between 0.2 and 0.4. Therefore, the coefficient Nz is preferably between 0.2 and 0.4.

Table 1 shows front contrasts and ratios of the first and second comparative examples and the first and second embodiments. The ratios are those with the front contrast of the first comparative example as 100%. In the second comparative example using a conventional light diffusing plate, the front contrast is decreased to 50% to 60%, whereas in the first and second embodiments, front contrasts of 88% and 94% are ensured, respectively.

TABLE 1

|  | 1st Comparative Example | 2nd Comparative Example | 1st Embodiment | 2nd Embodiment |
|---|---|---|---|---|
| Front Contrast | 25 | 12 to 15 | 22 | 23.5 |
| Ratio | 100% | 50% to 60% | 88% | 94% |

Table 2 shows regions where the contrast Co in the 12-6 o'clock direction is equal to or greater than 4 in the first comparative example and the first and second embodiments. The 12 o'clock side in the 12-6 o'clock direction is represented by minus values. The rates of improvement are those with the range of viewing angle of the first comparative example as 1. In the first and second embodiments, the rates of improvement are 1.47 or more and 1.72 or more, respectively.

TABLE 2

| 12–6 O'clock | Region Where Contrast ≧ 4 | Rate of Improvement |
|---|---|---|
| 1st Comparative Example | −33° to 25° (58°) | 1 |
| 1st Embodiment | −50° or greater to 35° (85° or greater) | 1.47 or more |
| 2nd Embodiment | −50° or greater to 50° or greater (100° or greater) | 1.72 or more |

Table 3 shows regions where the contrast Co in the 9-3 o'clock direction is equal to or greater than 4 in the first comparative example and the first and second embodiments. The 9 o'clock side in the 9-3 o'clock direction are represented by minus values. The rates of improvement are those with the range of viewing angle of the first comparative example as 1. In the first and second embodiments, the rate of improvement is 1.52 or more.

TABLE 3

| 9–3 O'clock | Region Where Contrast ≧ 4 | Rate of Improvement |
|---|---|---|
| 1st Comparative Example | −33° to 33° (66°) | 1 |
| 1st Embodiment | −50° or greater to 50° or greater (100°) | 1.52 or more |
| 2nd Embodiment | −50° or greater to 50° or greater (100°) | 1.52 or more |

From these results, it is apparent that compared with the prior arts, the viewing angle is widened by 50% or more and the decrease in front contrast is restrained to approximately 10% in the first and second embodiments using the light diffusing plates 7 and 7a and the three-dimensional phase difference plates 3 and 4.

The structure of a liquid crystal display apparatus according to a third embodiment is similar to that of the liquid crystal display apparatus 1 shown in FIG. 1. Basic structural members, axes of disposition and the disposition of the backlighting system are similar to those of the first embodiment. What is different from the first embodiment is that uniaxially drawn phase difference plates are used as the phase difference plates 3 and 4. The uniaxially drawn phase difference plates 3 and 4 are formed, for example, from polycarbonate and have a retardation value of 435 nm.

In order that the comparative characteristic is well balanced, the angle between the s low axis direction P6 of the uniaxially drawn phase difference plate 3 and the viewing angle widening direction P3 of the light diffusing plate 7 is between 20° and 30°.

By using the uniaxially drawn phase difference plates 3 and 4, the directions in which the light is diffused by the uniaxially drawn phase difference plates 3 and 4 and the light diffusing plate 7 are different from those of the first embodiment. Specifically, with respect to the light incident on the uniaxially drawn phase difference plates 3 and 4, the viewing angle is widened in the 9-3 o'clock direction. With respect to the light incident on the light diffusing plate 7, the viewing angle is widened in the 12-6 o'clock direction where the viewing angle is not widened by the uniaxially drawn phase difference plates 3 and 4 with a sufficient front contrast being ensured.

The structure of a liquid crystal display apparatus according to a fourth embodiment is similar to that of the liquid crystal display apparatus 1a shown in FIG. 5. Basic structural members, axes of disposition and the disposition of the backlighting system are similar to those of the second embodiment. What is different from the second embodiment is that uniaxially drawn phase difference plates are used as the phase difference plates 3 and 4. The uniaxially drawn phase difference plates 3 and 4 are formed, for example, from polycarbonate and have a retardation value of 435 nm.

Conditions for disposing the structural members and the directions in which the viewing angle of the light is widened by the uniaxially drawn phase difference plates 3 and 4 and the light diffusing plate 7a are similar to those of the third embodiment.

A liquid crystal display apparatus according to a third comparative example has basic structural members, axes of disposition and the disposition of the backlighting system similar to those of the first comparative example. What is different from the first comparative example is that uniaxially drawn phase difference plates are used as the phase difference plates 3 and 4. Like in the third embodiment, the viewing angle in the 9-3 o'clock direction is improved by the uniaxially drawn phase difference plates 3 and 4.

A liquid crystal display apparatus according to a fourth comparative example has basic structural members, axes of disposition and the disposition of the backlighting system similar to those of the second comparative example. What is different from the second comparative example is that uniaxially drawn phase difference plates are used as the phase difference plates 3 and 4. The direction in which the viewing angle is widened by the uniaxially drawn phase difference plates 3 and 4 is similar to that of the third embodiment.

Subsequently, results of viewing angle characteristic evaluations of the third embodiment and the third comparative example will be described with reference to isocontrast curves.

Figure 13A:
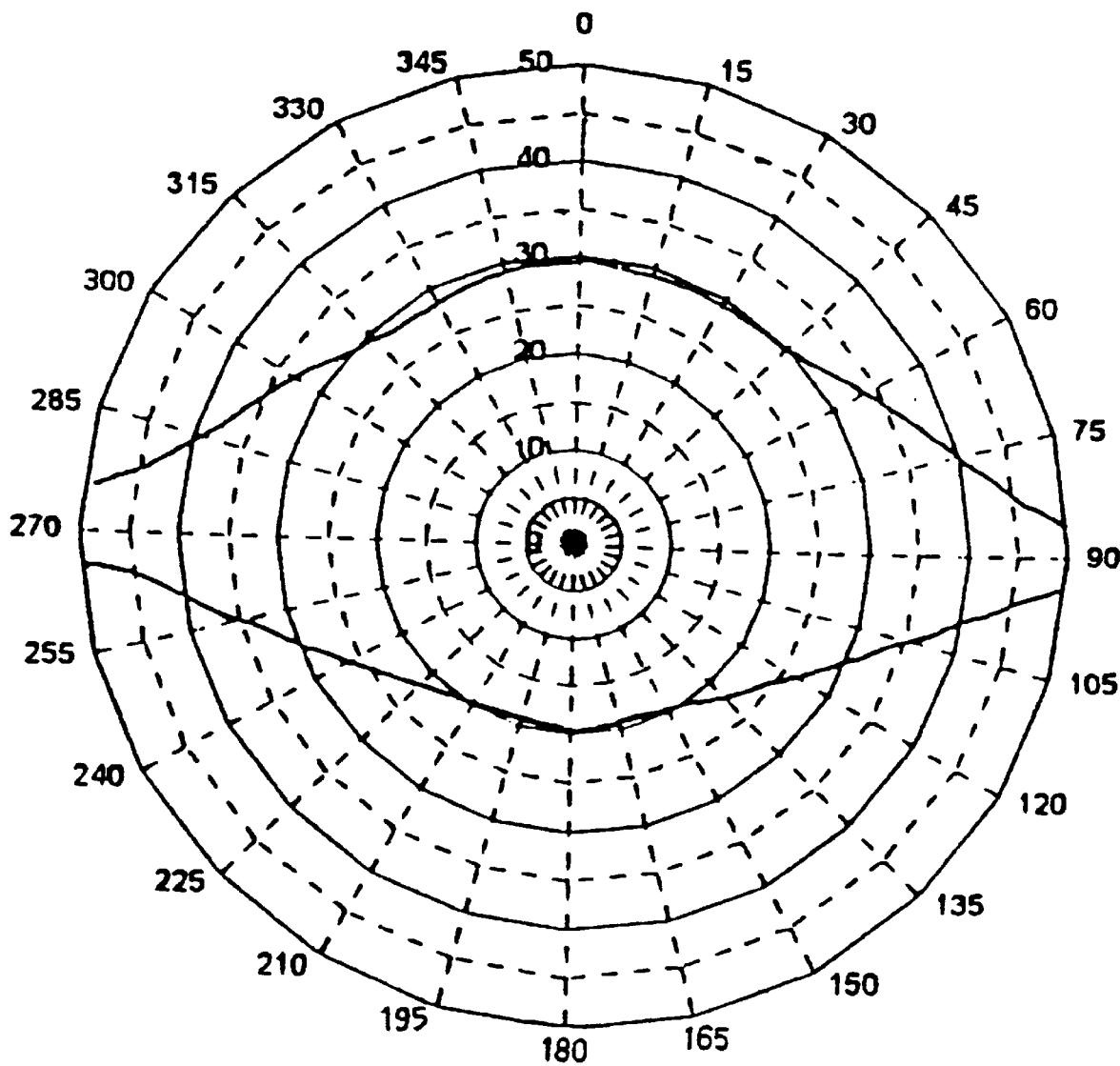
Figure 14A:
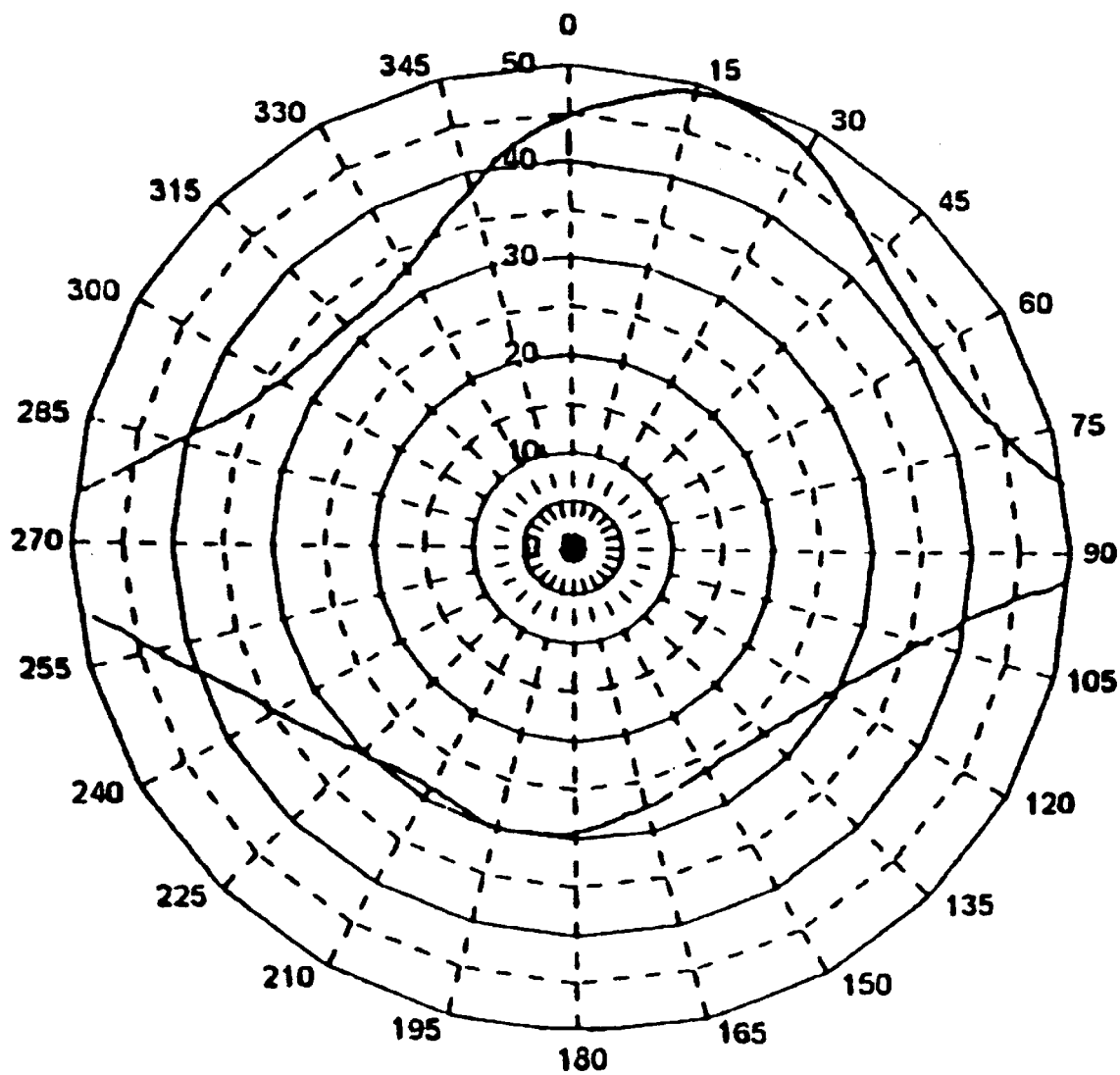
FIGS. 14A through 14D graphically show isocontrast curves where the contrast Co is 4 when the angle of intersection between the slow axis direction P6 of the uniaxially drawn phase difference plate 3 and the viewing angle widening direction P3 of the light diffusing plate 7 is varied in the case where the coefficient Nz of the uniaxially drawn phase difference plates 3 and 4 of the third embodiment is 0.3.
Figure 14B:
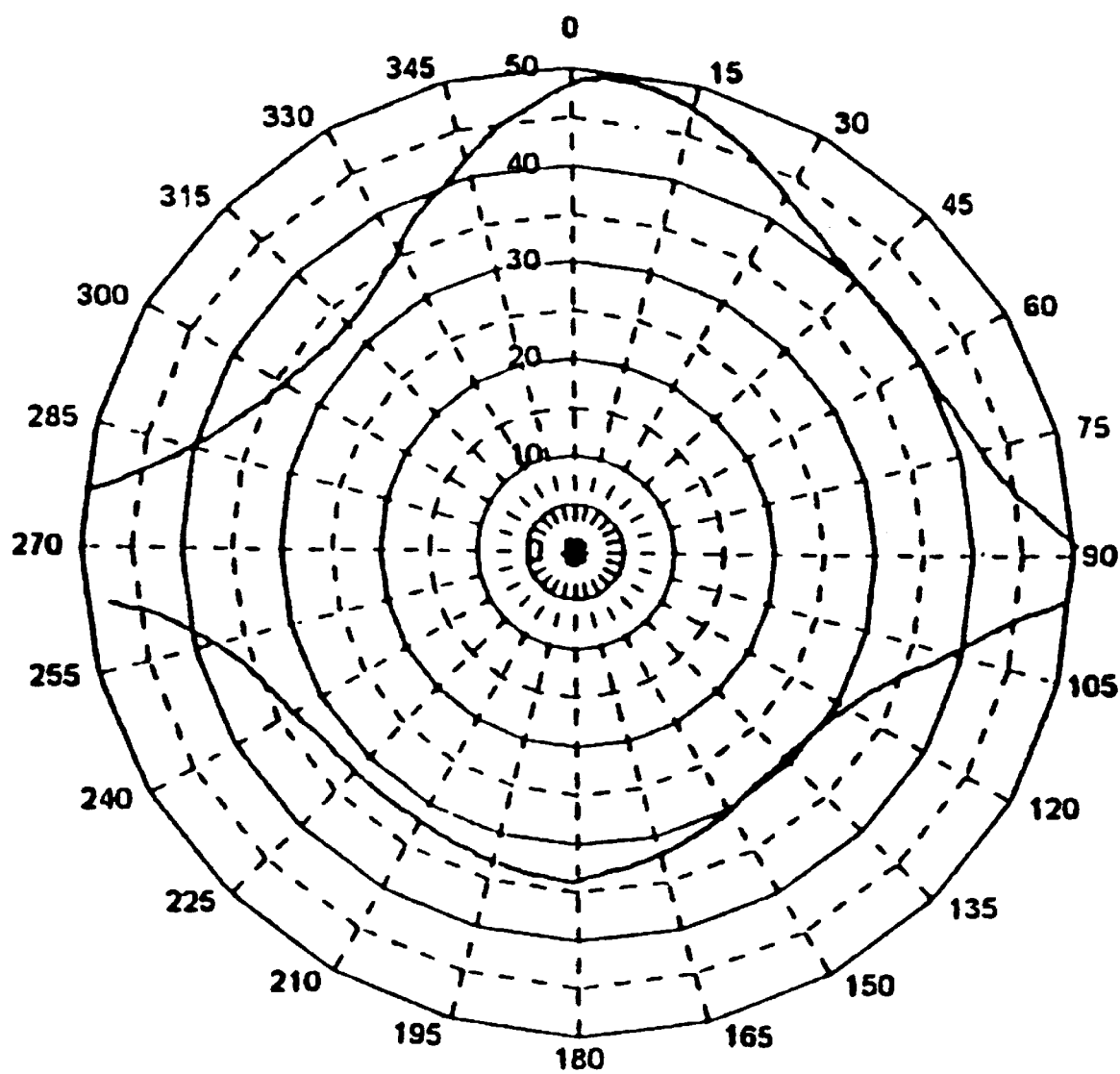
Figure 14C:
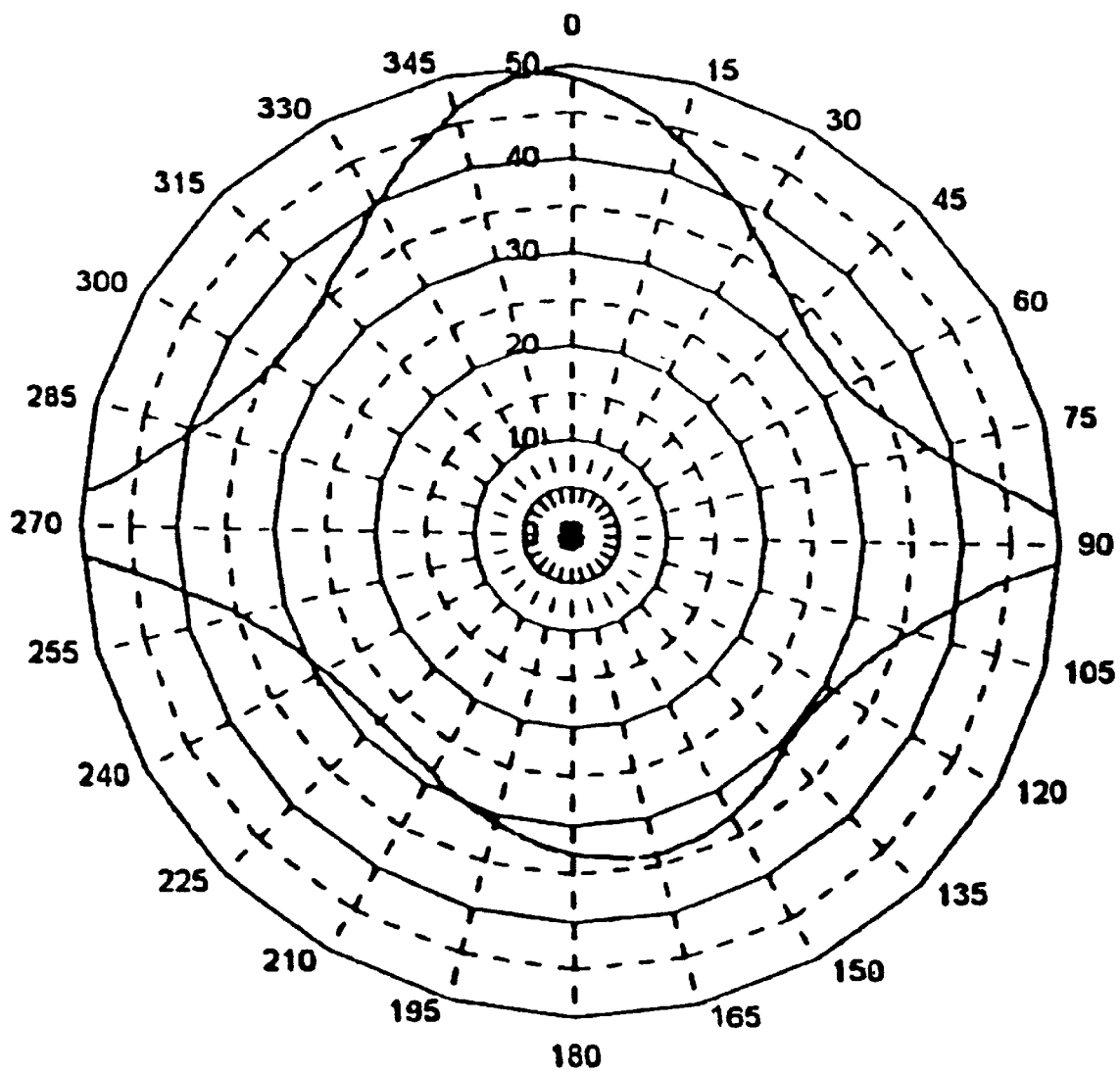
Figure 14D:
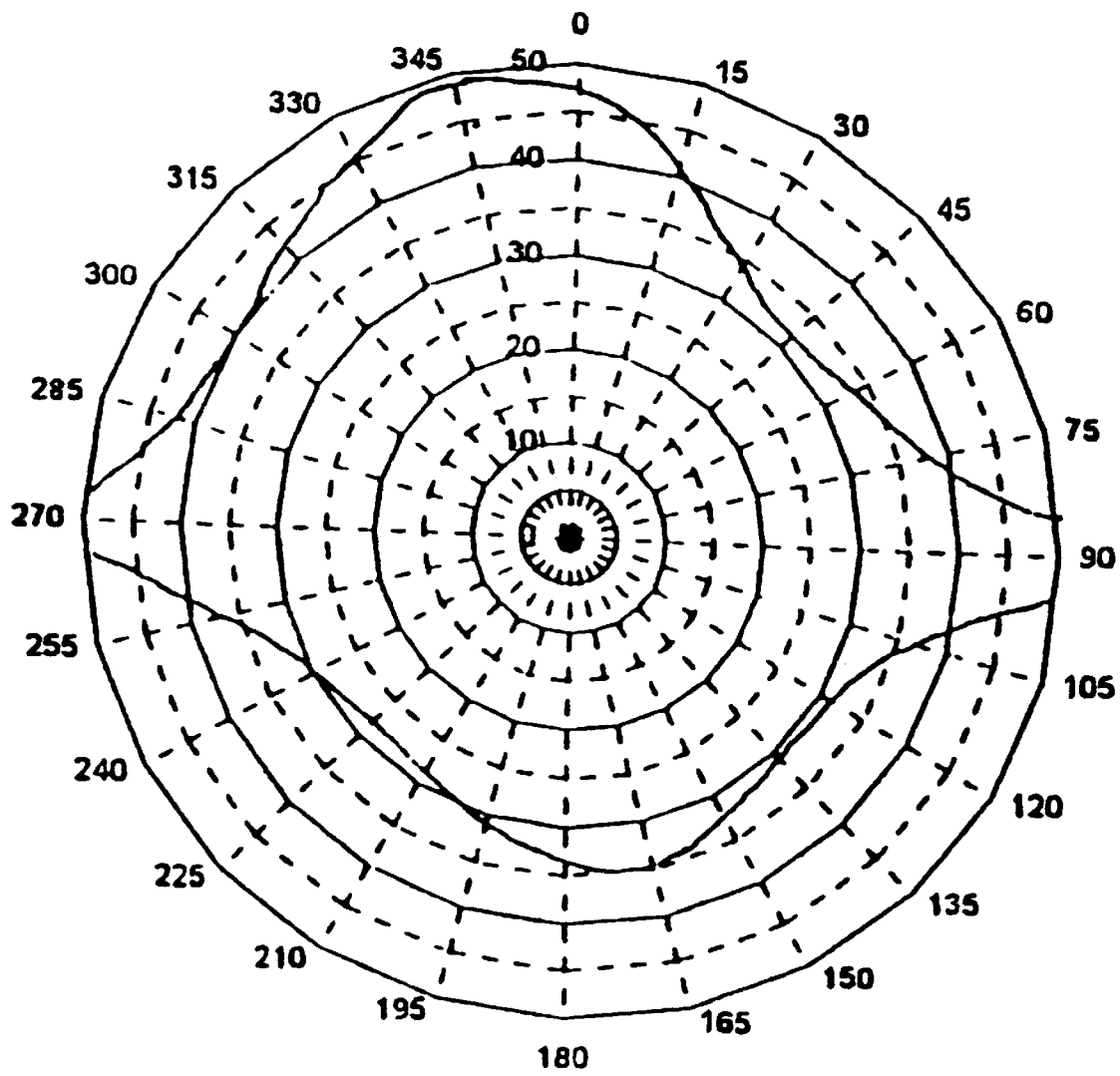

FIGS. 13A and 13B graphically show isocontrast curves where the contrast Co is 4. FIG. 13A shows results of the third comparative example. FIG. 13B shows results of the third embodiment. It is apparent that compared with the third comparative example using only the uniaxially drawn phase difference plates 3 and 4, the third embodiment using both the uniaxially drawn phase difference plates 3 and 4 and the light diffusing plate 7 provides a well-balanced wide viewing angle characteristic in all directions.

FIGS. 14A through 14D graphically show isocontrast curves where the contrast Co is 4 when the angle of intersection between the slow axis direction P6 of the uniaxially drawn phase difference plate 3 and the viewing angle widening direction P3 of the light diffusing plate 7 is varied in the case where the coefficient Nz of the uniaxially drawn phase difference plates 3 and 4 is 0.3 in the liquid crystal display apparatus according to the third embodiment. FIGS. 14A to 14D show results obtained when the angle of intersection is varied by 10° from 10° to 40°. It is apparent that ill-balanced isocontrast curves are obtained when the angle of intersection is 10° and 40°. Therefore, to obtain a well-balanced symmetrical viewing angle characteristic, the angle of intersection is preferably between 20° and 30° where the viewing angle characteristic is symmetrical.

Table 4 shows front contrasts and ratios of the third and fourth comparative examples and the third and fourth embodiments. The ratios are those with the front contrast of the third comparative example as 100%. In the third and fourth embodiments, front contrasts of 80% and 88% are ensured, respectively.

TABLE 4

|  | 3rd Comparative Example | 4th Comparative Example | 3rd Embodiment | 4th Embodiment |
| --- | --- | --- | --- | --- |
| Front Contrast | 25 | 12 to 15 | 21 | 22 |
| Ratio | 100% | 50% to 60% | 80% | 88% |

Table 5 shows regions where the contrast Co in the 12-6 o'clock direction is equal to or greater than 4 in the third comparative example and the third and fourth embodiments. The rates of improvement are those with the range of viewing angle of the third comparative example provided with no light diffusing plate as 1. In the third and fourth embodiments, the rate of improvement is 1.68 or more.

TABLE 5

| 12–6 O'clock | Region where Contrast ≧ 4 | Rate of Improvement |
| --- | --- | --- |
| 3rd Comparative Example | −30° to 20° (50°) | 1 |
| 3rd Embodiment | −50° to 34° (84°) | 1.68 or more |
| 4th Embodiment | −50° to 34° (84°) | 1.68 or more |

Table 6 shows regions where the contrast Co in the 9-3 o'clock direction is equal to or greater than 4 in the third comparative example and the third and fourth embodiments. It is apparent that with respect to the 9-3 o'clock direction, a viewing angle range is obtained similar to the relatively wide viewing angle range of the third comparative example used as the reference.

TABLE 6

| 9–3 O'clock | Region Where Contrast ≧ 4 | Rate of Improvement |
| --- | --- | --- |
| 3rd Comparative Example | −50° to 50° (100°) | 1 |
| 3rd Embodiment | −50° to 50° (100°) | 1 |
| 4th Embodiment | −50° to 50° (100°) | 1 |

From these results, it is apparent that compared with the third comparative example not using the light diffusing plate but using only the uniaxially drawn phase difference plates 3 and 4, the viewing angle is widened by 50% or more and the decrease in front contrast is restrained to approximately 15% in the third and fourth embodiments using the light diffusing plate 7 and the uniaxially drawn phase difference plates 3 and 4.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A liquid crystal display apparatus comprising:
   a pair of polarizing plates;
   a super twisted nematic liquid crystal display device interposed between the polarizing plates;
   a light diffusing plate for diffusing light having exited from the liquid crystal display device, in a predetermined direction; and
   a phase difference plate for improving a viewing angle in a direction in which the light is not diffused by the light diffusing plate, the phase difference plate being interposed at least between the polarizing plate on a light exit side and the liquid crystal display device, wherein refractive indices nx, ny and nz of the phase difference plate in three-dimensional direction hold a relationship of nx>nz>ny and an angle between a direction in which the light is diffused by the light diffusing plate and a slow axis of the phase difference plate adjacent to the light diffusing plate is selected to be in a range between 60° and 80°.

2. The liquid crystal display apparatus of claim 1, wherein the light diffusing plate is disposed between the polarizing plate on the light exit side and the phase difference plate adjacent to the polarizing plate.

3. The liquid crystal display apparatus of claim 2, wherein the light diffusing plate is formed by laminating two films each provided with regions of different refractive indices, the regions are formed in parallel with a direction inclined at a predetermined angle to a direction of normal of the films in the predetermined direction, and the predetermined angles are set in opposite directions with respect to the direction of normal of the films.

4. The liquid crystal display apparatus of claim 1, wherein the light diffusing plate is disposed on the outer side of the polarizing plate on the light exit side.

5. The liquid crystal display apparatus of claim 4, wherein the light diffusing plate is formed of a drawn polymeric film and having a plurality of spaced recesses on a surface thereof and the recesses are formed in a direction orthogonal to the predetermined direction.

6. The liquid crystal display apparatus of claim 1, wherein a coefficient Nz which is expressed by $Nz=(nx-nz)/(nx-ny)$ and represents a ratio of a change in retardation value to a change in elevation angle of the phase difference plate is selected to be in a range between 0.2 and 0.4 when a wavelength $\lambda$ is 633 nm.

7. The liquid crystal display apparatus of claim 1 further comprising a back light.

8. The liquid crystal display apparatus of claim 1 wherein said predetermined direction of said light diffusing plate is orthogonal to said direction of the improved viewing angle of said phase difference plate.

9. The liquid crystal display apparatus of claim 1 wherein said light diffusing plate is formed as a directional film.

* * * * *